United States Patent
Aizen et al.

(10) Patent No.: US 11,042,951 B2
(45) Date of Patent: Jun. 22, 2021

(54) AUTOMATED REAL ESTATE TRANSACTION WORKFLOW MANAGEMENT APPLICATION EXTENDING AND IMPROVING AN EXISTING EMAIL APPLICATION

(71) Applicant: Amitree, Inc., San Francisco, CA (US)

(72) Inventors: Jonathan Aizen, San Francisco, CA (US); Itay Rabinowitz, San Francisco, CA (US); Lisa Kovacevich, San Francisco, CA (US); Marc McCole, San Francisco, CA (US); Luke Dauter, San Francisco, CA (US)

(73) Assignee: AMITREE, INC., San Francisco, CA (US)

( * ) Notice: Subject to any disclaimer, the term of this patent is extended or adjusted under 35 U.S.C. 154(b) by 208 days.

(21) Appl. No.: 16/013,702

(22) Filed: Jun. 20, 2018

(65) Prior Publication Data

US 2018/0374171 A1    Dec. 27, 2018

Related U.S. Application Data

(60) Provisional application No. 62/523,653, filed on Jun. 22, 2017.

(51) Int. Cl.
*G06Q 50/16* (2012.01)
*G06Q 10/10* (2012.01)
(Continued)

(52) U.S. Cl.
CPC ....... *G06Q 50/167* (2013.01); *G06K 9/00469* (2013.01); *G06Q 10/107* (2013.01);
(Continued)

(58) Field of Classification Search
CPC .... G06Q 50/16; G06Q 50/167; G06Q 50/163; G06Q 10/06; G06Q 10/10; G06Q 10/107;
(Continued)

(56) References Cited

U.S. PATENT DOCUMENTS

| | | | |
|---|---|---|---|
| 2006/0074793 A1* | 4/2006 | Hibbert | G06Q 40/00 705/38 |
| 2010/0106651 A1* | 4/2010 | Tate | G06Q 10/10 705/80 |

(Continued)

OTHER PUBLICATIONS

Amitree webpage on Folio, May 26, 2016, [/https://web.archive.org/web/20160526191846/https://www.amitree.com/] (Year: 2016).*

(Continued)

*Primary Examiner* — Dennis W Ruhl
*Assistant Examiner* — Donald J Edmonds
(74) *Attorney, Agent, or Firm* — Wilson Sonsini Goodrich & Rosati

(57) ABSTRACT

Described are systems, media, and methods for automated real estate transaction workflow management application comprising: performing an initial analysis of a user's stored email, wherein the initial analysis comprises identifying at least one existing real estate transaction and identifying any stored email associated with the at least one existing real estate transaction; performing an incremental analysis of the user's new email, wherein the incremental analysis comprises identifying at least one new real estate transaction and identifying any new email associated with the at least one new real estate transaction; extracting real estate transaction-related events, documents, contacts, and data from the email identified as associated with an existing or new real estate transaction; and generating a timeline for each existing and new real estate transaction, the timeline comprising the transaction-related events arranged chronologically and providing access to the transaction-related documents, contacts, and data.

20 Claims, 17 Drawing Sheets

(51) Int. Cl.
*G06K 9/00* (2006.01)
*H04L 12/58* (2006.01)

(52) U.S. Cl.
CPC .......... *H04L 51/22* (2013.01); *G06K 2209/01* (2013.01); *H04L 51/08* (2013.01)

(58) Field of Classification Search
CPC .. G06Q 10/1093; G06Q 10/1095; G06Q 9/00; H04L 51/00; H04L 51/16
USPC ...................... 709/206; 705/35, 313, 80, 308
See application file for complete search history.

(56) References Cited

U.S. PATENT DOCUMENTS

| | | | | |
|---|---|---|---|---|
| 2010/0179961 A1* | 7/2010 | Berry | ................... | G06F 40/284 707/769 |
| 2011/0078085 A1* | 3/2011 | Clement | ................ | G06Q 30/06 705/313 |
| 2011/0288962 A1* | 11/2011 | Rankin, Jr. | ................... | 705/27.1 |
| 2011/0289161 A1* | 11/2011 | Rankin, Jr. | .......... | G06Q 10/107 709/206 |
| 2013/0325606 A1* | 12/2013 | Balduf | ........................ | 705/14.53 |
| 2014/0081690 A1* | 3/2014 | Winters | ......... | G06Q 10/063114 705/7.15 |
| 2014/0136381 A1* | 5/2014 | Joseph | ................... | G06Q 40/02 705/35 |
| 2014/0223284 A1* | 8/2014 | Rankin, Jr. | ........... | G06F 17/248 715/234 |
| 2017/0308533 A1* | 10/2017 | Lu | ....................... | G06F 17/3053 |

OTHER PUBLICATIONS

Amitree webpage on Folio, May 26, 2016, [/https://web.archive.org/web/20160526191846/https://www.amitree.com/] (Year: 2016) (Attached as NPL document).*

PCT/US2018/038570 International Search Report and Written Opinion dated Oct. 12, 2018.

* cited by examiner

AUTOMATED REAL ESTATE TRANSACTION WORKFLOW MANAGEMENT APPLICATION EXTENDING AND IMPROVING AN EXISTING EMAIL APPLICATION

CROSS-REFERENCE TO RELATED APPLICATIONS

This application claims the benefit of U.S. Application Ser. No. 62/523,653, filed Jun. 22, 2017, the entire contents of which are hereby incorporated by reference.

BACKGROUND OF THE INVENTION

Residential real estate is one of the largest markets in the U.S., representing annual sales of over $1T. This figure accounts for the home sales alone, and does not factor in the related transactions, including lending, insurance, appraisals, inspections, title and escrow, security, utilities, movers, and attorney work, among other things. Real estate transactions are further complicated by the number of parties generally involved. For example, in the case of residential real estate conveyance, where a seller conveys their ownership in a residential property to a buyer, real estate agents serve to facilitate the sale of the property, representing a buyer, a seller, or both. Real estate agents assist with the logistics of the sale, and have numerous duties varying depending on the party they represent. Agents who work for a seller advise the seller on pricing a home, preparing it for sale, including pre-sale improvements, marketing the property through listing services, networking, advertisements, and selecting the right purchase offer. Agents who work for a buyer search for available properties suitable for their client and advise on bidding strategy and negotiation. Agents also assist the process of the home sale by helping to contact contractors and inspectors, and keeping track of deadlines associated with sale of the property.

Real estate agents generally make money on a commission basis, earning a percentage of the sale price. Thus, an agent's success is dependent on successful completion of a sale, and so is tied to the agent's ability to effectively attend to their clients' needs.

SUMMARY OF THE INVENTION

Sale of residential property is a complicated transaction. A series of administrative hurdles must be overcome in order to complete the sale. For example, since most real estate purchases are financed with debt, approval from lenders is needed to arrange funding prior to the close. Approval necessitates the submission of a series of financial documents before fund dispersal, and an independent appraisal of the home's value is also required. Inspections for potential issues such as lead paint, termites, pests, and radon gas, among others, are arranged to avoid future liabilities and worries. The numerous tasks involved make the sale of a property complicated and onerous for all parties involved. Buyers must put a deposit on the house and pay for title insurance and escrow services to ensure they will take possession of the property as expected following the close. The buyer must arrange for home insurance, security services, utilities, cable and internet, and movers prior to closing. Additionally, the involvement of an attorney may be required, depending on the specifics of the particular property and laws of the state. This administrative process can be convoluted, leaving buyers confused and requiring a concerted effort to obtain control and visibility into their transactions. For the average buyer, learning about and managing each of these processes can be a major challenge, turning the potentially joyful, life-changing experience of buying a home into an endless series of chores. In an effort to manage these tasks, buyers become overwhelmed with making checklists, creating phone reminders, and tracking timelines and deadlines. On the seller side, there is no shortage of needed services in preparing to sell their property, including painting, staging, marketing, furniture storage, and all of the same services buyers need because sellers move too.

From the perspective of a real estate agent, managing this process is an essential part of their job. An agent must ensure that the buyer gets through the process to the close, ideally, as quickly as possible. Guiding clients through the process, finding relevant service providers, and generally coordinating between multiple parties takes time which could be directed toward generating new business. Historically, there was no automated system designed to guide buyers along the way, thus leaving agents to manually keep tabs of their clients' progress. More clients means more emails, paperwork and phone calls, creating an organizational bottleneck that limits an agent's ability to dedicate time to generating new business and limiting productivity overall.

What is needed is an efficient and easy to use platform for workflow management which assists homebuyers and sellers with the numerous financial and administrative tasks associated with the sale and purchase of real estate. An effective platform should be a centralized online platform for organizing information on multiple transactions for an agent, while also providing this information to specific buyers, sellers, and other transaction participants and scheduling and triggering tasks along the full process of the home purchase.

In some embodiments, such a process integrates with an agent's email account to automatically organize all the emails, documents, contacts, and key transaction deadlines for agents and their clients, taking the stress and logistical pain out of the real estate transaction. In some embodiments, the process is conducted through a browser plug-in, extension, add-in, or add-on. In other embodiments, the process is conducted on a mobile application. In other embodiments, the process is conducted in a web application or a desktop application. In some embodiments, the mobile application, desktop application, and/or web application can be synchronized with a browser plug-in, extension, add-in, or add-on.

In one aspect, disclosed herein are computer-implemented systems comprising: a digital processing device comprising: at least one processor, an operating system configured to perform executable instructions, a memory, and a computer program including instructions executable by the digital processing device to generate an automated real estate transaction workflow management application comprising: a software module performing (e.g., for performing and/or configured to perform) an initial analysis of a user's stored email, wherein the initial analysis comprises scanning for, attempting to identify, and optionally identifying at least one existing real estate transaction and identifying any stored email associated with the at least one existing real estate transaction; a software module performing an incremental analysis of the user's new email, wherein the incremental analysis comprises identifying any new email associated with the at least one existing real estate transaction, and scanning for, attempting to identify, and optionally identifying at least one new real estate transaction and identifying any new email associated with the at least one new real estate transaction; a software module extracting real estate transaction-related events, documents, contacts, and data from the email identified as associated with an existing or new real estate transaction; and a software module generating a timeline for each existing and new real estate transaction, the timeline comprising the transaction-related events arranged chronologically and providing access to the transaction-related documents, contacts, and data; wherein the real estate transaction workflow management application integrates with and improves an existing email application. In some embodiments, the real estate transaction workflow management application is implemented as a web browser extension, add-on, or plug-in. In some embodiments, the user's email is web-based email and the existing email application is a web browser. In various embodiments, the initial analysis is performed on the user's stored email that is less than about 60, 50, 40, 30, 20, or 10 days old. In some embodiments, the initial analysis or the incremental analysis is configurable by the user or by an administrator. In some embodiments, the incremental analysis is performed when the user sends or receives email. In some embodiments, identifying any stored email associated with the at least one existing real estate transaction and identifying any new email associated with the at least one new real estate transaction comprises performing OCR on one or more documents attached to the email. In some embodiments, extracting real estate transaction-related events, documents, contacts, and data from the email identified as associated with an existing or new real estate transaction comprises performing OCR on one or more documents attached to an email. In some embodiments, the real estate transaction workflow management application further comprises a software module synching the user's calendar, contacts, and document management applications with the extracted events, contacts, and documents. In some embodiments, the real estate transaction workflow management application further comprises a software module presenting an interface allowing the user to share the timeline. In some embodiments, the real estate transaction workflow management application further comprises a software module identifying participants in an existing or new real estate transaction and sharing access to the timeline with each participant. In further embodiments, the software module identifying participants in an existing or new real estate transaction and sharing access to the timeline with each participant further notifies each participant when the timeline is updated. In some embodiments, the real estate transaction workflow management application further comprises a software module providing an interface allowing the user to provide feedback on the identification of the at least one existing real estate transaction. In further embodiments, the real estate transaction workflow management application further comprises a software module providing an interface allowing the user to provide feedback on the identification of the stored email associated with the at least one existing real estate transaction. In some embodiments, the real estate transaction workflow management application further comprises a software module providing an interface allowing the user to provide feedback on the identification of the at least one new real estate transaction. In further embodiments, the real estate transaction workflow management application further comprises a software module providing an interface allowing the user to provide feedback on the identification of the new email associated with the at least one new real estate transaction. In some embodiments, the real estate transaction workflow management application further comprises a software module providing an interface allowing the user to provide feedback on the extraction of the real estate transaction-related events, documents, contacts, and data from the email.

In another aspect, disclosed herein are non-transitory computer-readable storage media encoded with a computer program including instructions executable by a processor to create an automated real estate transaction workflow management application comprising: a software module performing an initial analysis of a user's stored email, wherein the initial analysis comprises scanning for, attempting to identify, and optionally identifying at least one existing real estate transaction and identifying any stored email associated with the at least one existing real estate transaction; a software module performing an incremental analysis of the user's new email, wherein the incremental analysis comprises identifying any new email associated with the at least one existing real estate transaction; and scanning for, attempting to identify, and optionally identifying at least one new real estate transaction and identifying any new email associated with the at least one new real estate transaction; a software module extracting real estate transaction-related events, documents, contacts, and data from the email identified as associated with an existing or new real estate transaction; and a software module generating a timeline for each existing and new real estate transaction, the timeline comprising the transaction-related events arranged chronologically and providing access to the transaction-related documents, contacts, and data; wherein the real estate transaction workflow management application integrates with and improves an existing email application. In some embodiments, the real estate transaction workflow management application is implemented as a web browser extension, add-on, or plug-in. In some embodiments, the user's email is web-based email and the existing email application is a web browser. In various embodiments, the initial analysis is performed on the user's stored email that is less than about 60, 50, 40, 30, 20, or 10 days old. In some embodiments, the initial analysis or the incremental analysis is configurable by the user or an administrator. In some embodiments, the incremental analysis is performed when the user sends or receives email. In some embodiments, identifying any stored email associated with the at least one existing real estate transaction and identifying any new email associated with the at least one new real estate transaction comprises performing OCR on one or more documents attached to the email. In some embodiments, extracting real estate transaction-related events, documents, contacts, and data from the email identified as associated with an existing or new real estate transaction comprises performing OCR on one or more documents attached to an email. In some embodiments, the real estate transaction workflow management application further comprises a software module synching the user's calendar, contacts, and document management applications with the extracted events, contacts, and documents. In some embodiments, the real estate transaction workflow management application further comprises a software module presenting an interface allowing the user to share the timeline. In some embodiments, the real estate transaction workflow management application further comprises a software module identifying participants in an existing or new real estate transaction and sharing access to the timeline with each participant. In further embodiments, the software module identifying participants in an existing or new real estate transaction and sharing access to the timeline with each participant further notifies each participant when the timeline is updated. In some embodiments, the real estate transaction workflow management application further comprises a software module providing an interface allowing the user to provide feedback on the identification of the at least one existing real estate transaction. In further embodiments, the real estate transaction workflow management application further comprises a software module providing an interface allowing the user to provide feedback on the identification of the stored email associated with the at least one existing real estate transaction. In some embodiments, the real estate transaction workflow management application further comprises a software module providing an interface allowing the user to provide feedback on the identification of the at least one new real estate transaction. In further embodiments, the real estate transaction workflow management application further comprises a software module providing an interface allowing the user to provide feedback on the identification of the new email associated with the at least one new real estate transaction. In some embodiments, the real estate transaction workflow management application further comprises a software module providing an interface allowing the user to provide feedback on the extraction of the real estate transaction-related events, documents, contacts, and data from the email.

In another aspect, disclosed herein are computer-implemented methods of automatically managing workflow of a real estate transaction comprising: performing, by a computer, an initial analysis of a user's stored email, wherein the initial analysis comprises scanning for, attempting to identify, and optionally identifying at least one existing real estate transaction; identifying, by the computer, any stored email associated with the at least one existing real estate transaction; performing, by the computer, an incremental analysis of the user's new email, wherein the incremental analysis comprises scanning for, attempting to identify, and optionally identifying at least one new real estate transaction; identifying, by the computer, any new email associated with the at least one existing real estate transaction, or the at least one new real estate transaction; extracting, by the computer, real estate transaction-related events, documents, contacts, and data from the email identified as associated with an existing or new real estate transaction; and generating, by the computer, a timeline for each existing and new real estate transaction, the timeline comprising the transaction-related events arranged chronologically and providing access to the transaction-related documents, contacts, and data, wherein the timeline integrates with and improves an existing email application. In some embodiments, the user's email is web-based email and the existing email application is a web browser. In various embodiments, the initial analysis is performed on the user's stored email that is less than about 60, 50, 40, 30, 20, or 10 days old. In some embodiments, the incremental analysis is performed when the user sends or receives email. In some embodiments, identifying any stored email associated with the at least one existing real estate transaction and identifying any new email associated with the at least one new real estate transaction comprises performing OCR on one or more documents attached to the email. In some embodiments, extracting real estate transaction-related events, documents, contacts, and data from the email identified as associated with an existing or new real estate transaction comprises performing OCR on one or more documents attached to an email. In some embodiments, the method further comprises synching, by the computer, the user's calendar, contacts, and document management applications with the extracted events, contacts, and documents. In some embodiments, the method further comprises presenting, by the computer, an interface allowing the user to share the timeline. In some embodiments, the method further comprises identifying, by the computer, participants in an existing or new real estate transaction and sharing access to the timeline with each participant. In further embodiments, the method further comprises notifying, by the computer, each participant when the timeline is updated. In some embodiments, the method further comprises receiving, by the computer, feedback from the user on the identification of the at least one existing real estate transaction. In further embodiments, the method further comprises receiving, by the computer, feedback from the user on the identification of the stored email associated with the at least one existing real estate transaction. In some embodiments, the method further comprises receiving, by the computer, feedback from the user on the identification of the at least one new real estate transaction. In further embodiments, the method further comprises receiving, by the computer, feedback from the user on the identification of the new email associated with the at least one new real estate transaction. In some embodiments, the method further comprises receiving, by the computer, feedback from the user on the extraction of the real estate transaction-related events, documents, contacts, and data from the email.

BRIEF DESCRIPTION OF THE DRAWINGS

A better understanding of the features and advantages of the described subject matter will be obtained by reference to the following detailed description that sets forth illustrative embodiments and the accompanying drawings of which.

DETAILED DESCRIPTION OF THE INVENTION

Figure 1:
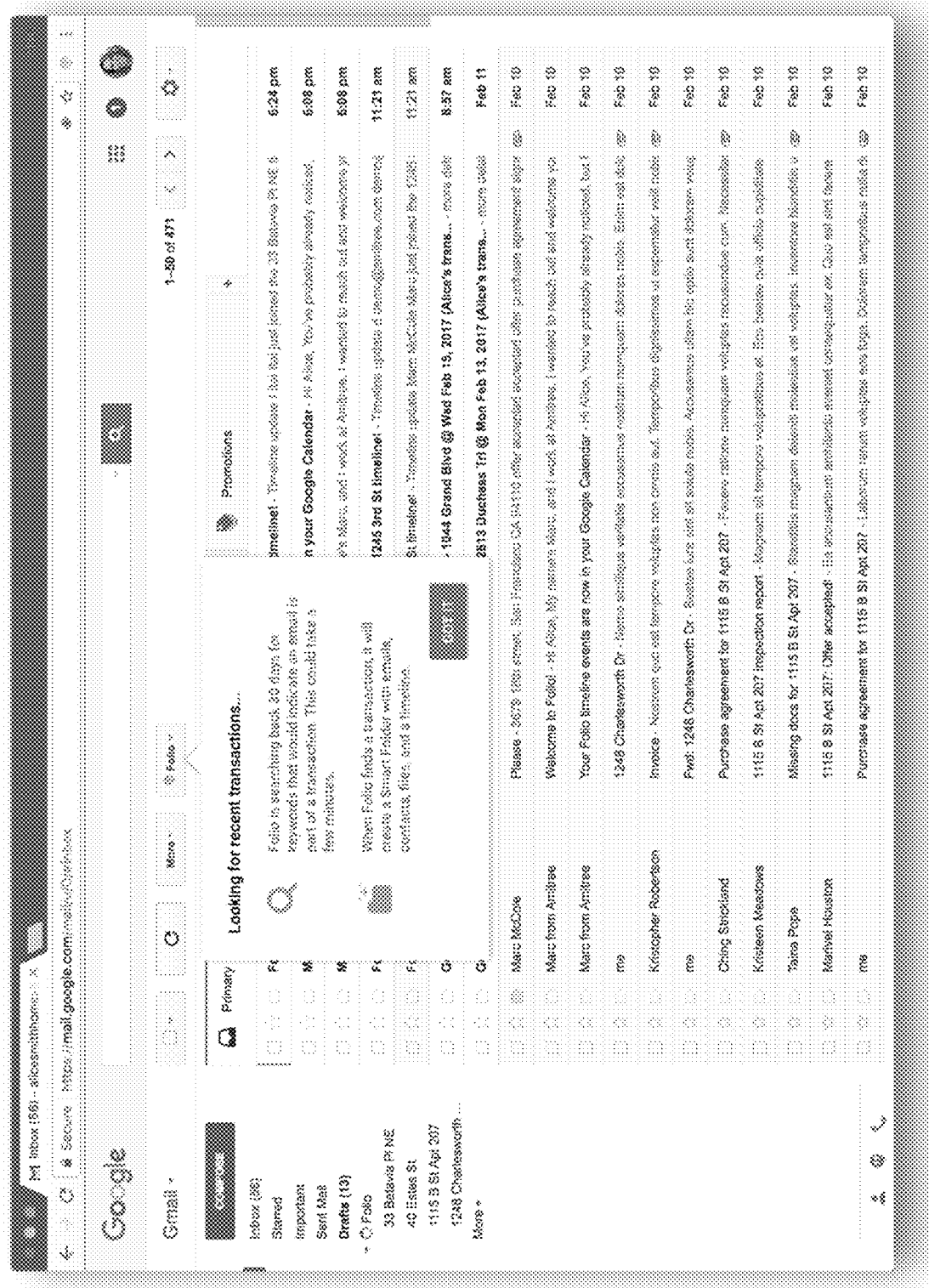
FIG. 1 shows a non-limiting graphic user interface for an automated real estate transaction workflow management application; in this case, a screen displaying identification of real estate transactions from an email inbox.

Described herein, in certain embodiments, are computer-implemented systems comprising: a digital processing device comprising: at least one processor, an operating system configured to perform executable instructions, a memory, and a computer program including instructions executable by the digital processing device to generate an automated real estate transaction workflow management application comprising: a software module performing an initial analysis of a user's stored email, wherein the initial analysis comprises identifying at least one existing real estate transaction and identifying any stored email associated with the at least one existing real estate transaction; a software module performing an incremental analysis of the user's new email, wherein the incremental analysis comprises identifying at least one new real estate transaction and identifying any new email associated with the at least one new real estate transaction; a software module extracting real estate transaction-related events, documents, contacts, and data from the email identified as associated with an existing or new real estate transaction; and a software module generating a timeline for each existing and new real estate transaction, the timeline comprising the transaction-related events arranged chronologically and providing access to the transaction-related documents, contacts, and data; wherein the real estate transaction workflow management application integrates with and improves an existing email application.

Also described herein, in certain embodiments, are non-transitory computer-readable storage media encoded with a computer program including instructions executable by a processor to create an automated real estate transaction workflow management application comprising: a software module performing an initial analysis of a user's stored email, wherein the initial analysis comprises identifying at least one existing real estate transaction and identifying any stored email associated with the at least one existing real estate transaction; a software module performing an incremental analysis of the user's new email, wherein the incremental analysis comprises identifying at least one new real estate transaction and identifying any new email associated with the at least one new real estate transaction; a software module extracting real estate transaction-related events, documents, contacts, and data from the email identified as associated with an existing or new real estate transaction; and a software module generating a timeline for each existing and new real estate transaction, the timeline comprising the transaction-related events arranged chronologically and providing access to the transaction-related documents, contacts, and data; wherein the real estate transaction workflow management application integrates with and improves an existing email application.

Also described herein, in certain embodiments, are computer-implemented methods of automatically managing workflow of a real estate transaction comprising: performing, by a computer, an initial analysis of a user's stored email, wherein the initial analysis comprises identifying at least one existing real estate transaction; identifying, by the computer, any stored email associated with the at least one existing real estate transaction; performing, by the computer, an incremental analysis of the user's new email, wherein the incremental analysis comprises identifying at least one new real estate transaction; identifying, by the computer, any new email associated with the at least one new real estate transaction; extracting, by the computer, real estate transaction-related events, documents, contacts, and data from the email identified as associated with an existing or new real estate transaction; and generating, by the computer, a timeline for each existing and new real estate transaction, the timeline comprising the transaction-related events arranged chronologically and providing access to the transaction-related documents, contacts, and data, wherein the timeline integrates with and improves an existing email application.

Certain Definitions

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Buyers

Many buyers suitably participate in the real estate transactions described herein. In some embodiments, a buyer is a single individual, organization, business, non-governmental organization, government agency, or entity. In other embodiments, a buyer is more than one individual, organization, business, non-governmental organization, government agency, or entity with a common interest. In further embodiments, a buyer is 2, 3, 4, 5, 6, 7, 8, 9, 10, 11, 12, 13, 14, 15, 16, 17, 18, 19, 20, 30, 40, 50, 60, 70, 80, 90, 100 or more, including increments therein, individuals, organizations, businesses, government agencies, or entities with a common interest. In still further embodiments, a buyer is a group, holding company, consortium, or conglomerate.

Sellers

Many sellers suitably participate in the real estate transactions described herein. In some embodiments, a seller is a single individual, organization, business, non-governmental organization, government agency, or entity. In other embodiments, a seller is more than one individual, organization, business, non-governmental organization, government agency, or entity with a common interest. In further embodiments, a seller is 2, 3, 4, 5, 6, 7, 8, 9, 10, 11, 12, 13, 14, 15, 16, 17, 18, 19, 20, 30, 40, 50, 60, 70, 80, 90, 100 or more, including increments therein, individuals, organizations, businesses, government agencies, or entities with a common interest. In still further embodiments, a seller is a group, holding company, consortium, or conglomerate.

Performing Initial and Incremental Analysis

In some embodiments, the platforms, systems, media, and methods described herein include an initial analysis, an incremental analysis, or both an initial and an incremental analysis of a user's email, or use of the same.

In some embodiments, the platforms, systems, media, and methods described herein include a software module configured to perform an initial analysis of a user's email. In some embodiments, the initial analysis is referred to as an initial scan. In some embodiments, the software module performing an initial analysis scans emails received by a user at least 15, 20, 30, 40, 50, 60, 70, 80, 90, 100, 150, 200, 250, or 300 days before the date the initial analysis is performed, including increments therein. In some embodiments, the software module performing an initial analysis scans emails received by a user at least 1, 2, 3, 4, 5, 10, 15, 20, 30, 40, or 50 years before date the initial analysis is performed, including increments therein. In some embodiments, the initial analysis is configurable by a user or by an administrator to modify how far back in time the analysis scans a user's emails. In a preferred embodiment, the software module performing an initial analysis scans emails received by a user at least 30 days before the date the initial analysis is performed. In some embodiments, an initial analysis is completed in less than about 15, 14, 13, 12, 11, 10, 9, 8, 7, 6, 5, 4, 3, 2, or 1 minutes. In some embodiments, an initial analysis is performed every time a new authentication token is created (e.g. when the user registers a new external account with the workflow management application).

In some embodiments, the platforms, systems, media, and methods described herein include a software module configured to perform an incremental analysis of a user's stored email. In some embodiments, the incremental analysis is referred to as an incremental scan. In some embodiments, the software module performs an incremental analysis whenever a user sends new email. In some embodiments, the software module performs an incremental analysis whenever a user receives new email. In some embodiments, the incremental analysis scans emails received by a user since the last incremental analysis was performed, or if no incremental analysis has been performed, then since the initial analysis was performed. In some embodiments, when, e.g., the user's external account is a Google email account, the workflow management application uses Google's Pub/Sub service. In some embodiments, the workflow management application uses a dedicated dyno type that queries the external account repeatedly looking for tokens that are associated with accounts that have new emails. Such tokens are flagged and a second dedicated dyno type subsequently ensures that an incremental scan is run. In some embodiments, the second dedicated dyno type is referred to as a Syncer. In some embodiments, when, e.g., the user's external account is a Microsoft email account, the workflow management system round robins and scans each token based on how recently it was scanned.

In some embodiments, the software module performing an initial analysis or incremental analysis identifies new transactions. In some embodiments, the software module identifies new transactions by searching for emails containing key words or phrases related to real estate transactions to identify candidate emails. In some embodiments, the software module extracts data from candidate emails. In some embodiments, the data can be an email subject, body, attachment, name, PDF, optical character resolution (OCR), or PDF attachment text. In some embodiments, the software module identifies a new transaction by identifying in a candidate email a residential address that has not yet been associated with a known real estate transaction. In some embodiments, the software module stores a new transaction in a database, creating a known transaction. In some embodiments, before storing a new transaction as a known transaction, the software module prompts the user to confirm or reject the new transaction as a correctly or incorrectly identified new transaction. In some embodiments, a software module associates the email with the new known transaction. In some embodiments, a software module scans emails with large attachments separately to prevent bottlenecks in the initial or incremental analysis. In some embodiments, a large attachment has a file size greater than 0.5, 1, 2, 3, 4, 5, 6, 7, 8, 9, or 10 megabytes (MB). In a preferred embodiment, a large attachment has a file size greater than 1 MB. In some embodiments, the software module searches for emails containing key words by performing searches using the email applications's native search function. In some embodiments, the email application is a Google or a Microsoft email application. In some embodiments, the software module uses machine learning to perform searches for emails containing key words or phrases.

In some embodiments, the software module performing an initial analysis or incremental analysis associates user emails with known real estate transactions. A known real estate transaction is a real estate transaction that has been stored in the workflow management application. In some embodiments, known transactions are found in previous initial or incremental analyses. In some embodiments, known transactions are shared with the user by another user of the workflow management application.

Referring to FIG. 1, in a particular embodiment, the application performs an initial analysis of a user's Gmail inbox. The workflow management application is integrated into the users Gmail account. New real estate transactions identified by the initial analysis are shown by address in the folder tree on the left side of the email application under the parent folder, "Folio."

Extracting Transaction Related Information

In some embodiments, the platforms, systems, media, and methods described herein include extraction of transaction related events, dates, documents, contacts, and/or data, or use of the same. In some embodiments, a software module extracts transaction related information from an email identified in an initial or incremental analysis. In some embodiments, the software module extracts the sender's and recipient's names and email addresses and stores them as "found contacts" in a database associated with the transaction to which the email is associated. In some embodiments, a software module synchronizes extracted contact information with a user's existing personal online contact list. In some embodiments, the software module downloads attachments attached to an email identified in an initial or incremental analysis. The attachments may be fingerprinted using a hash function, such as, e.g., MD5. In some embodiments, a software module is configured to perform optical character resolution (OCR) on an email attachment and extracts the text within the attachment. In some embodiments, a name, sender, email message ID, fingerprint, event, date, document or other extracted data is stored in a database associated with the real estate transaction to which the email is associated. In some further embodiments, a software module creates an email label connecting an email to its associated transaction. Non-limiting examples of labels include a Gmail label and a Microsoft category. In some embodiments, a software module assigns an existing email label to an email connecting the email to its associated transaction. In some embodiments, extracted text is uploaded to a third party service to identify addresses in the text.

In some embodiments, the workflow management system includes a software module configured to extract transaction related information from documents manually added by a user to the application. In other embodiments, the workflow management system includes a software module configured to extract transaction related information from files imported from a network—based file storage system, computer application, website, web browser extension, add-on, plug-in, or mobile application.

Figure 4:
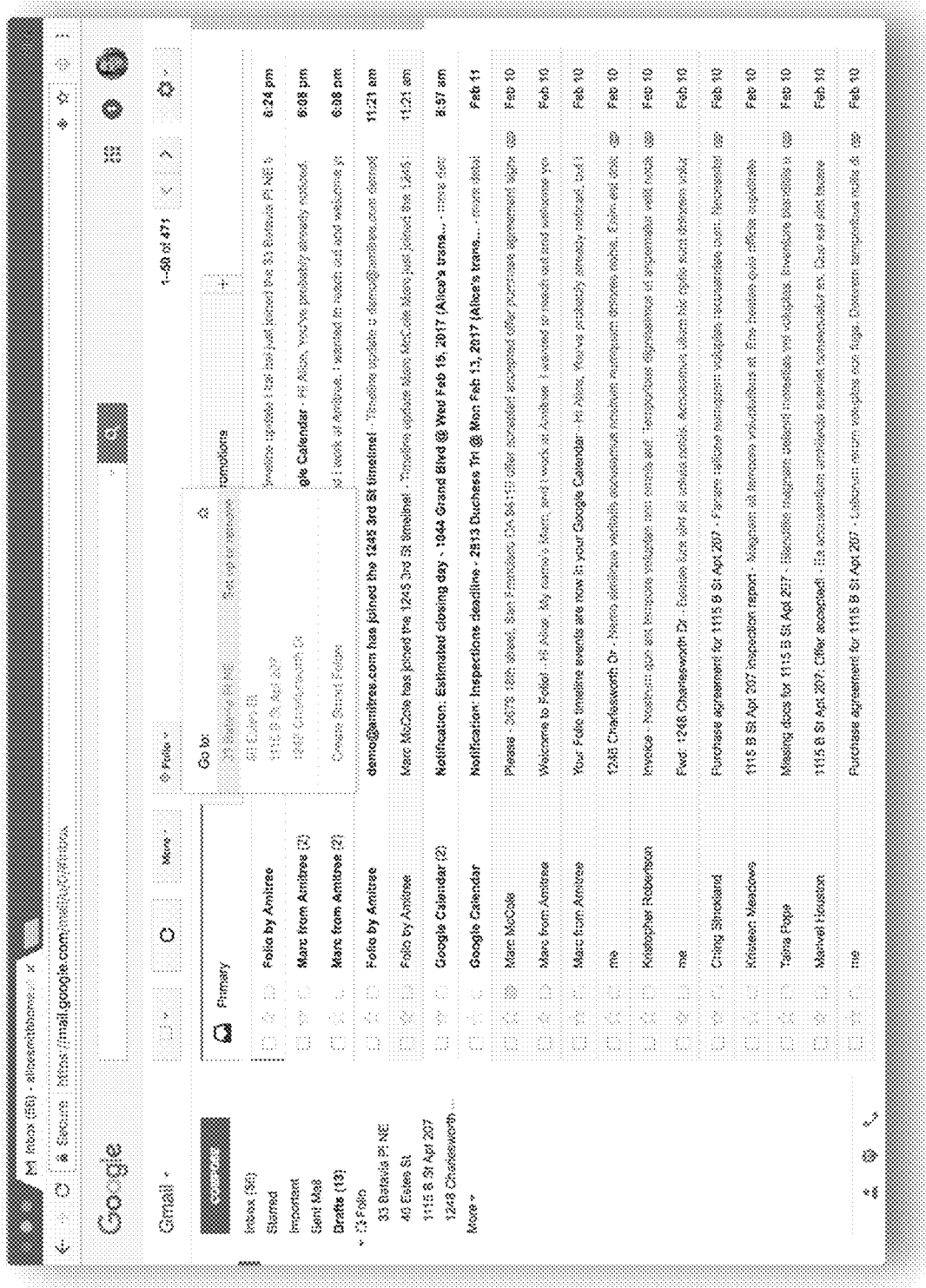
FIG. 4 shows a non-limiting graphic user interface for an automated real estate transaction workflow management application; in this case, an interface for selecting a real estate transaction identified by an initial analysis for setting up an email inbox smart folder.

Referring to FIG. 4, in a particular embodiment, the application provides a menu for the user to select identified new transactions based on data extracted from the email(s) associated with the new transactions.

Figure 5:
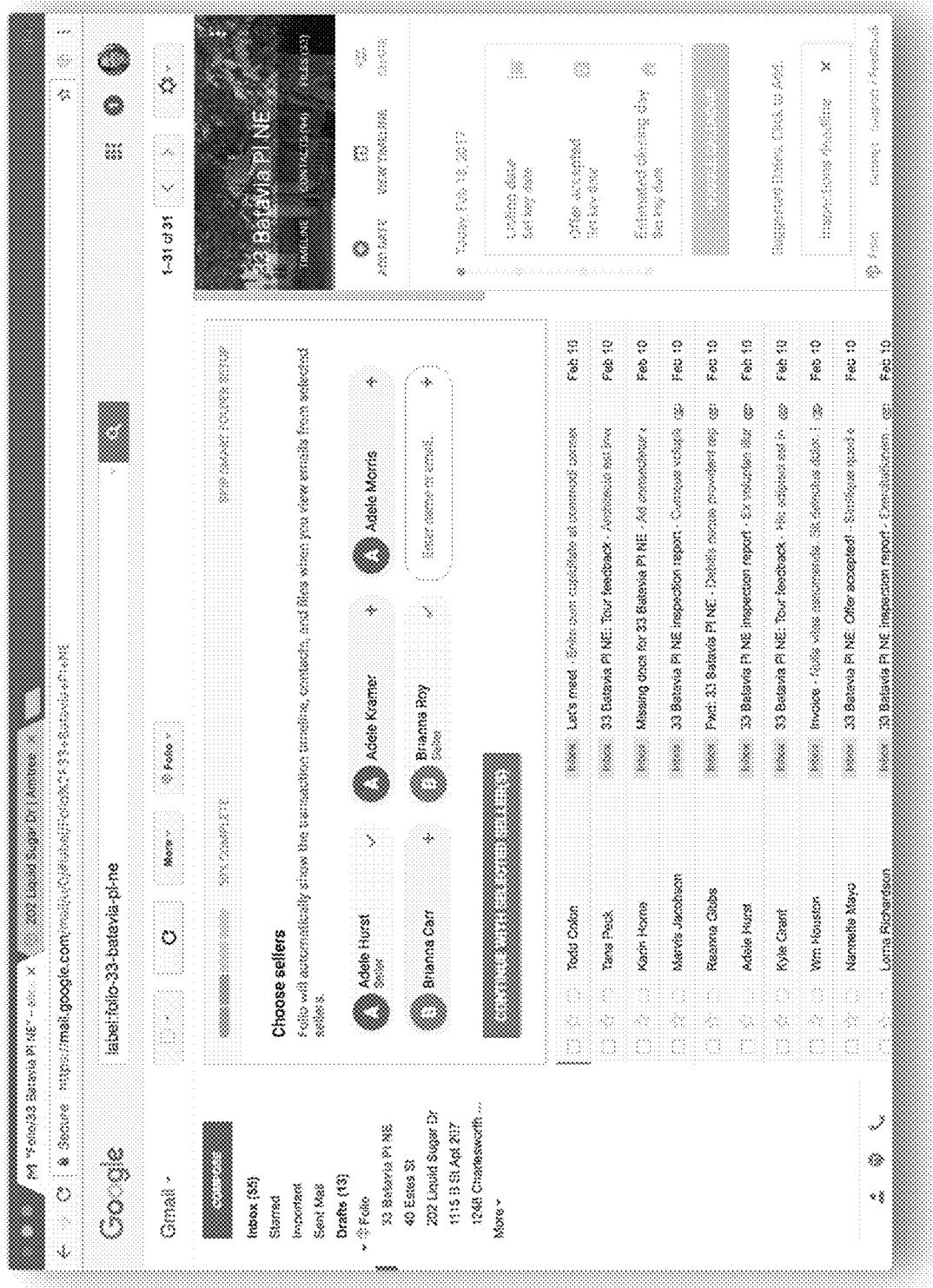
FIG. 5 shows a non-limiting graphic user interface for an automated real estate transaction workflow management application; in this case, an interface for selecting a seller(s) to associate with a real estate transaction when setting up an email inbox smart folder for an identified real estate transaction.
Figure 13:
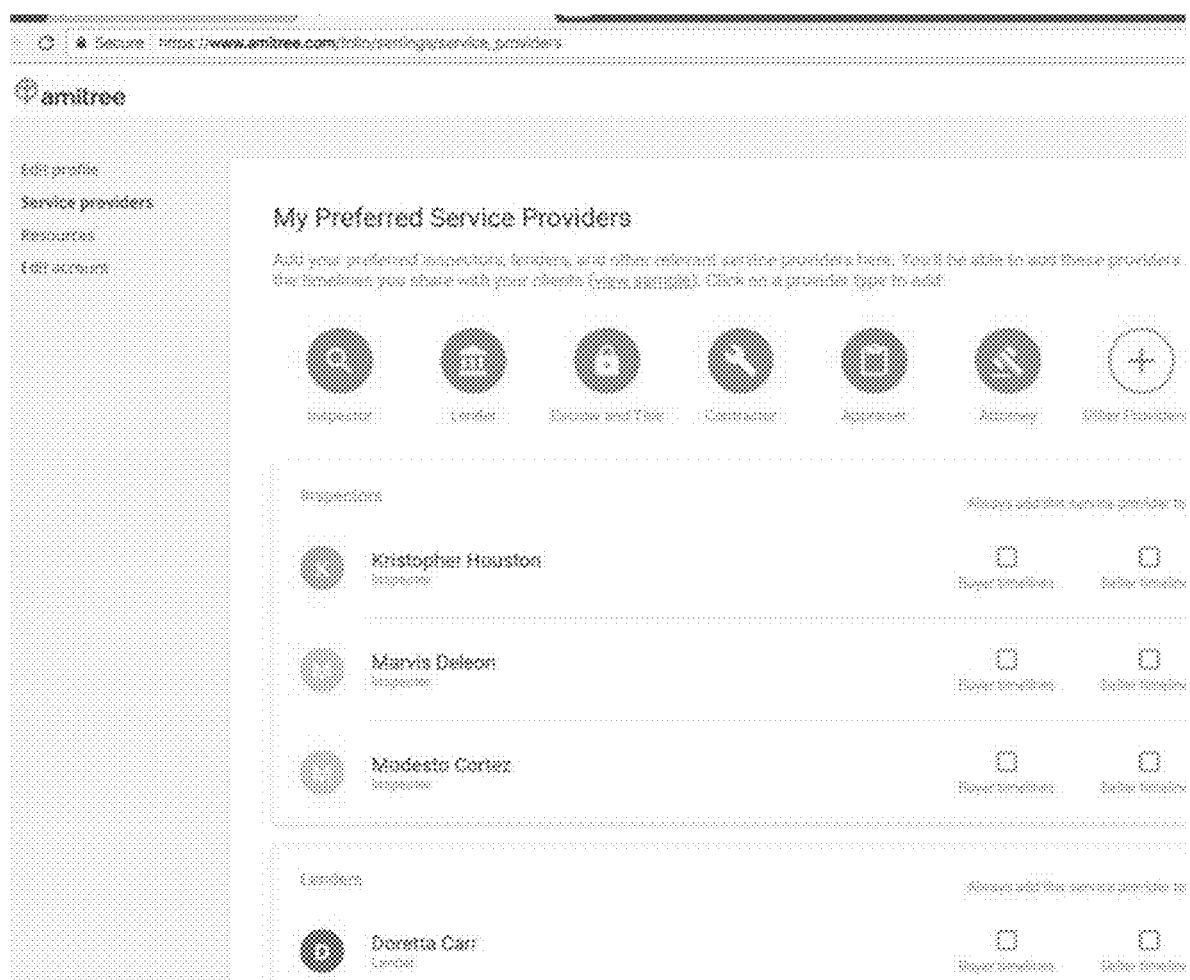
FIG. 13 shows a non-limiting graphic user interface for an automated real estate transaction workflow management application; in this case, an interface displaying service providers saved by the workflow management application.

Referring to FIG. 5, in a particular embodiment, the application prompts the user with suggested contacts to assign as a seller(s) based on the data extracted from the email(s) associated with the transaction. Referring to FIG. 13, in a particular embodiment, the application stores service providers in a database allowing a user to associate commonly used service providers with additional transactions.

Machine Learning

In some embodiments, the platforms, systems, media, and methods described herein use machine learning to improve the accuracy of identifying new transactions in initial and incremental analyses. machine learning is performed by a machine learning algorithm, which can use various input data generated by the workflow management system. In some embodiments, the input data can include a user confirmation that an identified new transaction was correctly identified by workflow management application. The input data can also include a user rejection of an incorrectly identified new transaction. In some embodiments, the input data can include user modifications to data associated with a transaction, or emails that are associated with new or existing transactions.

New transactions can be identified by searching for emails in a user's external email application that contain key words or phrases related to real estate transactions. These searches can take the form of queries generated by the machine learning algorithm. In some embodiments, a query is generated by an algorithm that takes as input multiple corpuses and a set of user inputs. A first corpus may be a set of emails that match each component of the query. For example, if the full query is "(ratified offer) OR (purchase agreement)" then the components would be "ratified offer" and "purchase agreement." A second corpus may be emails that belong to transactions that were manually created by a user rather than being identified by an initial or incremental search analysis. In some embodiments, the machine learning algorithm correlates query components with user confirmations and rejections of identified new transactions. The machine learning algorithm can retain query components that are strongly correlated with confirmations, while eliminating query components that are strongly correlated with rejections. The algorithm is thus able to respond to changes in the underlying messages as the vocabulary referring to real estate transactions in the user's emails change over time.

In one embodiment, to decrease the frequency of rejections, the machine learning algorithm reduces false positives by correlating emails belonging to transactions with user inputs related to rejection and confirmation. The algorithm runs a model on an email and produces a score indicating how likely a user would be to confirm that the email is associated with a valid transaction. The model is constructed and updated by evaluating textual content of emails derived from fields such as sender and recipient information, subject line, email body, attachment file names, and text within attachments. In some cases, text within attachment may be identified by optical character recognition (OCR) on images stored in the document. The textual content is correlated with confirmation and rejection data provided by users through an interface and used to predict how messages with similar textual content will be evaluated by the same or other users. Evaluation of the textual content of emails can involve a "bag of words/TFIDF" approach, which involves creating dictionaries of all terms used in each of the identified textual fields, computing term and document frequencies, and then generating document-term matrices. The matrices are then used as inputs in "ensemble model" construction to create multiple models. Models can include log-linear models, random forests, and neural networks. Results of the models can then be applied to a weighting scheme based on the effectiveness of each model to generate a score for an email identified by a query. The machine learning algorithm uses the score to determine whether or not the transaction should be created. The machine learning algorithm may also use the score to determine whether or not the transaction should be surfaced to the user. In some embodiments, the user can adjust the stringency of the machine learning algorithm based on their tolerance for false positives.

Figure 17:
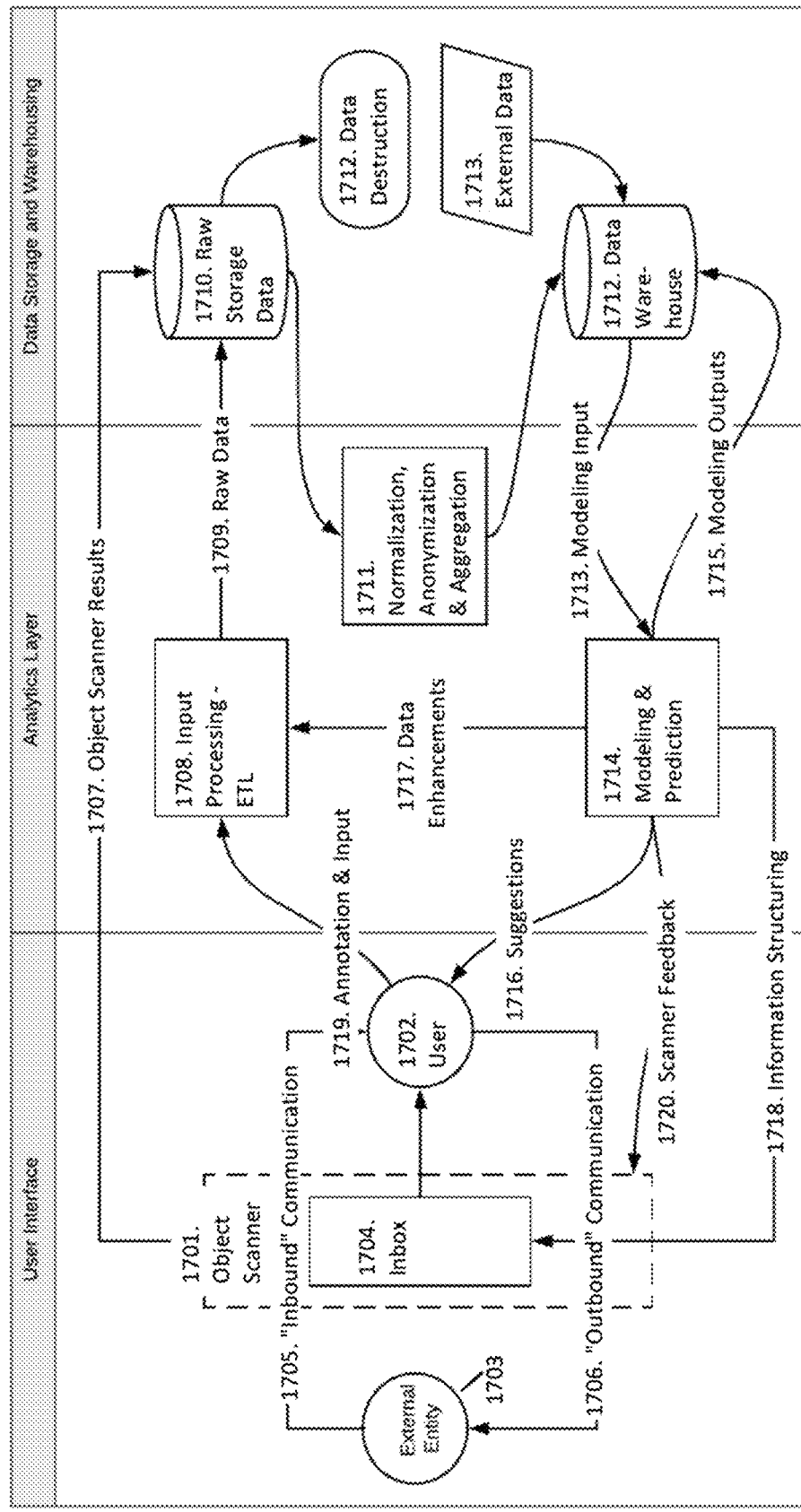
FIG. 17 shows a non-limiting schematic diagram of a machine learning algorithm for identifying new real estate transactions from a user's email.

Referring to FIG. 17, in a particular embodiment of a machine learning algorithm, a search of a user's (1702) email inbox (1704) by an object scanner (1701) for emails containing key words or phrases in data fields within the emails produces raw data, i.e. Object Scanner Results (1707), that is stored in a Raw Data Storage (1710). After processing (1711) the emails identified by the Object Scanner are then compared to stored models (1714) to generate a score for each email. Emails with a high enough score result in the creation of a new transaction, which is suggested to the user (1716). The user then confirms or rejects (1719) the suggestion. Confirmations or rejections are then input back into the machine learning algorithm (1708) and the confirmation and rejection data is correlated against new emails identified by the object scanner. Updated models are used to improve the queries used by the object scanner to search emails for new transactions (1720), improving the accuracy of future analyses.

Generation of queries by a machine learning algorithm to identify new transactions has numerous benefits for the user. User experience is enhanced by correct, automated identification of a user's transactions and minimized misidentification of non-transactions. Incorrectly identified transactions require additional work on the part of the user, negating some of the time saved for the user by the workflow management application. Additionally, in some embodiments, queries can be shared between multiple users' workflow management applications, allowing for an improvement in the accuracy of identified new transactions even for users who less frequently use the workflow management application.

Table 1 shows a non-limiting list of transaction related data that the workflow management application can extract from a user's email, attachments, files and/or documents, or user input, some exemplary methods by which the workflow management application can extract the data, and non-limiting examples of how the workflow management application or user can use the data.

TABLE 1

| Data point | Location | Method of extraction | Use of data |
| --- | --- | --- | --- |
| Listing price | Email content, listing agreement | OCR the listing agreement, train a machine learning (ML) engine with 10k annotated listing agreements | Pricing |
| Photos of the property | Email attachments, dropbox links | Search email for .png, .jpg., .tiff, .gif., + subject line/content "photos" | Single property website, client timeline |
| Price drops | Email content, attachments | Natural language processing (NLP), ML engine to detect likely phrases around "price drop," OCR attachments | Pricing |
| Key dates of transaction | Contract, transaction management platform | ML + OCR, integrations with TM | Pricing, Comparative Market Analysis (CMA) |
| Number of requests for disclosures, problems found in disclosures | Email content | NLP, ML engine to detect "request for disclosure" and associated phrases | Pricing, CMA |
| Showing activity/ feedback | Email content, Showing Time | ML engine to detect sentiment around showings, integration with Showing Time | Pricing, CMA, Offer analysis |
| Offer prices, number of offers, final accepted offer | Email content, offer attachments | OCR of offer attachment, ML engine to extract offer prices from common forms of offer attachments | Pricing, CMA, Offer analysis |
| Detailed property condition and key facts | Inspection report | OCR inspection report, train ML engine on various types of inspection reports (building a structured database of detailed property info from 1000s of unstructured inspection reports) | Insurance quoting/ underwriting, suggest repairs, suggest credits, pre-empt issues with appraisal insurability, Pricing, CMA, offer analysis |
| Request for credits | Email content, request for credit form attachments | OCR of attachments, ML to detect key phrases related to credits and extract meaning (NLP) | Advise agents for credits, coordinate credit process |
| Buyer search criteria/ listing data | Email content, listing agreement, user input | Train ML to detect buyer's criteria ("close to train" "single-family home in Chappaqua", etc.) and alert listing agents with listing agreements for properties that match criteria | Find clients for listings/match listing agents to buyer's agent based on what they're looking for. Automatically matches buyer' agent with seller's agent within a brokerage (sell this product to brokerages) |
| Final sale price at closing (including credits) | Email content, credits from attachment | OCR credits form, Train ML to extract final sale price out of email content and/or credits form | Pricing, CMA, Offer analysis |

TABLE 1-continued

| Data point | Location | Method of extraction | Use of data |
| --- | --- | --- | --- |
| Appraisal value | Appraisal report | OCR appraisal | Pricing, CMA |
| Title defects | Title reports from previous transactions of the property | OCR title report | Workflow, offer guidance, Pricing, CMA |

Synchronization

In some embodiments, the platforms, systems, media, and methods described herein include synchronization of extracted transaction related information with a user's external email application, contact list, or calendar. In some embodiments, when a user deletes an email label for a known transaction from their email account, a software module removes the corresponding email label from the workflow management application. In other embodiments, when a user deletes an email label for a known transaction from their email account, a software module removes the corresponding transaction from the workflow management application. In some embodiments, when a user makes changes to a contact's information in the user's personal online contact list, a software module makes the same change to the corresponding contact in the workflow management application. In some embodiments, when a makes changes to a contact's information in the workflow management application, a software module makes the same change to the corresponding contact in the user's personal online contact list. In some embodiments, if a user manually adds an email message to an email label associated with a transaction or removes an email message from a label associated with the email label, a software module makes the same change in the workflow management application. In some embodiments, if a user adds, changes, or removes a date in a timeline associated with a transaction from the workflow management application, a software module makes the same change to a corresponding event in a user's personal online calendar application. In other embodiments, the software module makes the same change to a corresponding event in the online calendar application of a second user with whom a transaction timeline has been shared. In some embodiments, synchronization the user's external email application, contact list, or calendar occurs every 1, 2, 3, 4, 5, 6, 7, 8, 9, 10, 11, 12, or 24 hours. In some embodiments, synchronization the user's external email application, contact list, or calendar occurs every 5, 10, 20, 30, 40, or 50 minutes. In some embodiments, the frequency of synchronization can be set by the user.

In some embodiments, the real estate transaction workflow management application is implemented as a web browser extension, add-on, or plug-in. In other embodiments, the workflow management application is conducted on a mobile application. In other embodiments, the workflow management application is conducted on a mobile-optimized web application. In some embodiments, the mobile application can be synchronized with a browser plug-in, extension, add-in, or add-on. In some embodiments, the mobile application can generate notifications for a user when changes are made to a timeline.

In some embodiments, the real estate transaction workflow management application synchronizes transaction-associated documents with a network-based file storage system. In some embodiments, the real estate transaction workflow management application synchronizes transaction-associated documents with an online document signing platform.

Generating a Timeline

In some embodiments, the platforms, systems, media, and methods described herein include automatically generating a timeline for a real estate transaction, or use of the same. In some embodiments, a timeline is a chronologically ordered sequence of transaction related events associated with a known real estate transaction. In some embodiments, a software module is configured add transaction related events extracted from an email to a timeline associated with the real estate transaction to which the email is associated. In some embodiments, a user can manually add events to a timeline. In some embodiments, the timeline associates additional information with an event on a timeline. In some embodiments, such additional information can be description, location, name(s), time, duration, notes, images, or other data. In some embodiments, a user can add, edit, or delete information associated with a timeline event. A timeline event can be any event related to the process of a real estate transaction. In some representative, non-limiting embodiments, an event can be an appraisal date, an appraisal contingency date, an appraisal deadline, a walkthrough, a final walkthrough, a final approval date, a financing period, an offer acceptance date, a closing date, an estimated closing day, an inspection date, an inspection contingency date, an inspection deadline, or an inspection objections deadline. In some embodiments, a timeline can store 1, 2, 3, 4, 5, 6, 7, 8, 9, 10, 11, 12, 13, 14, 15, 16, 17, 18, 19, 20, 30, 40, 50, 60, 70, 80, 90, 100, 150, 200, 300, 400, or 500 events associated with a single real estate transaction, including increments therein. In some embodiments, a user can share a timeline with another user of the workflow management system. In some embodiments, a user can share a timeline with a client, buyer, seller, or third party in a real estate transaction. A third party may be a participant in the real estate transaction. In some embodiments, a timeline is stored, viewed, and edited by a user on a website separate from the workflow management application. In some embodiments, a user can set, change, and remove permissions allowing or disallowing others from accessing a timeline on the website, which may be called a timeline website communication hub. In some embodiments, the timeline website provides links (e.g., hyperlinks) to other transaction related resources, such as home insurance concierge services, or postal change-of-address services. In some embodiments, a timeline is integrated into a user's existing email application. In some embodiments, the user's existing email application is referred to as an External Account. The timeline website may also allow users to set reminders on events, change the status of events, allow a user to download files associated with events, view service providers, and share transactions with other users.

In some embodiments, creation of a new transaction automatically generates an email notifying contacts associated with the transaction that they have access to a timeline. In some embodiments, a software module is configured to automatically send email reminders to contacts associated with timeline events notifying them of upcoming event dates. In some embodiments, when a user adds, removes, or makes a change to a timeline event, a software module may be configured to automatically send an email notification to contacts associated with the timeline event notifying them of the change. Notification emails may include an automatically generated link to the timeline website.

Figure 6:
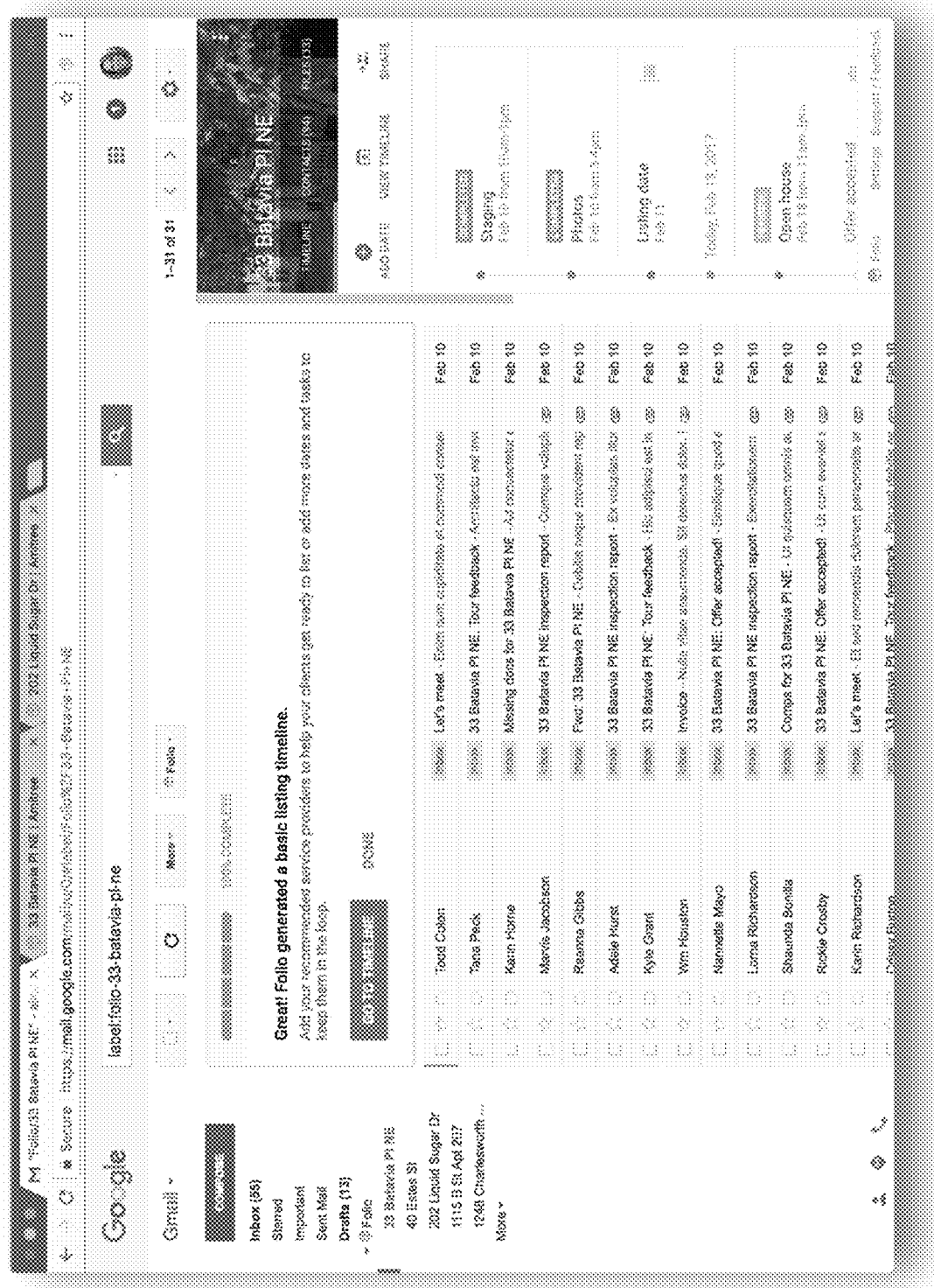
FIG. 6 shows a non-limiting graphic user interface for an automated real estate transaction workflow management application; in this case, an interface navigating to a newly created transaction timeline.

Referring to FIG. 6, in a particular embodiment, the application generates a timeline based on the data extracted from the emails(s) associated with the transaction. The timeline is displayed in the side bar integrated into the right side the user's Gmail application.

Figure 7:
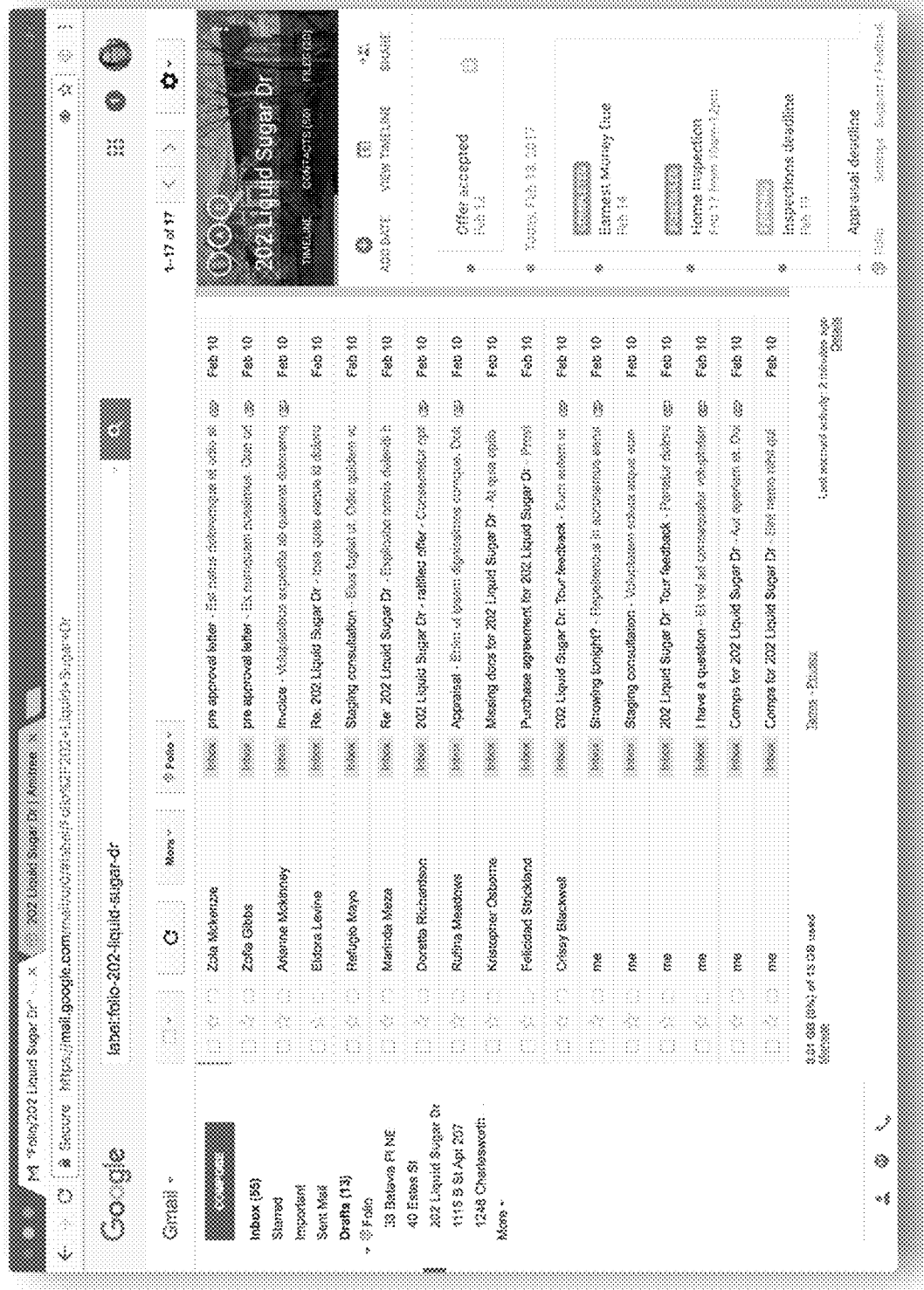
FIG. 7 shows a non-limiting graphic user interface for an automated real estate transaction workflow management application; in this case, an interface displaying an email inbox side bar which displays a transaction timeline.

Referring to FIG. 7, in a particular embodiment, the application displays a timeline in the side bar integrated into the right side the user's Gmail application.

Figure 8:
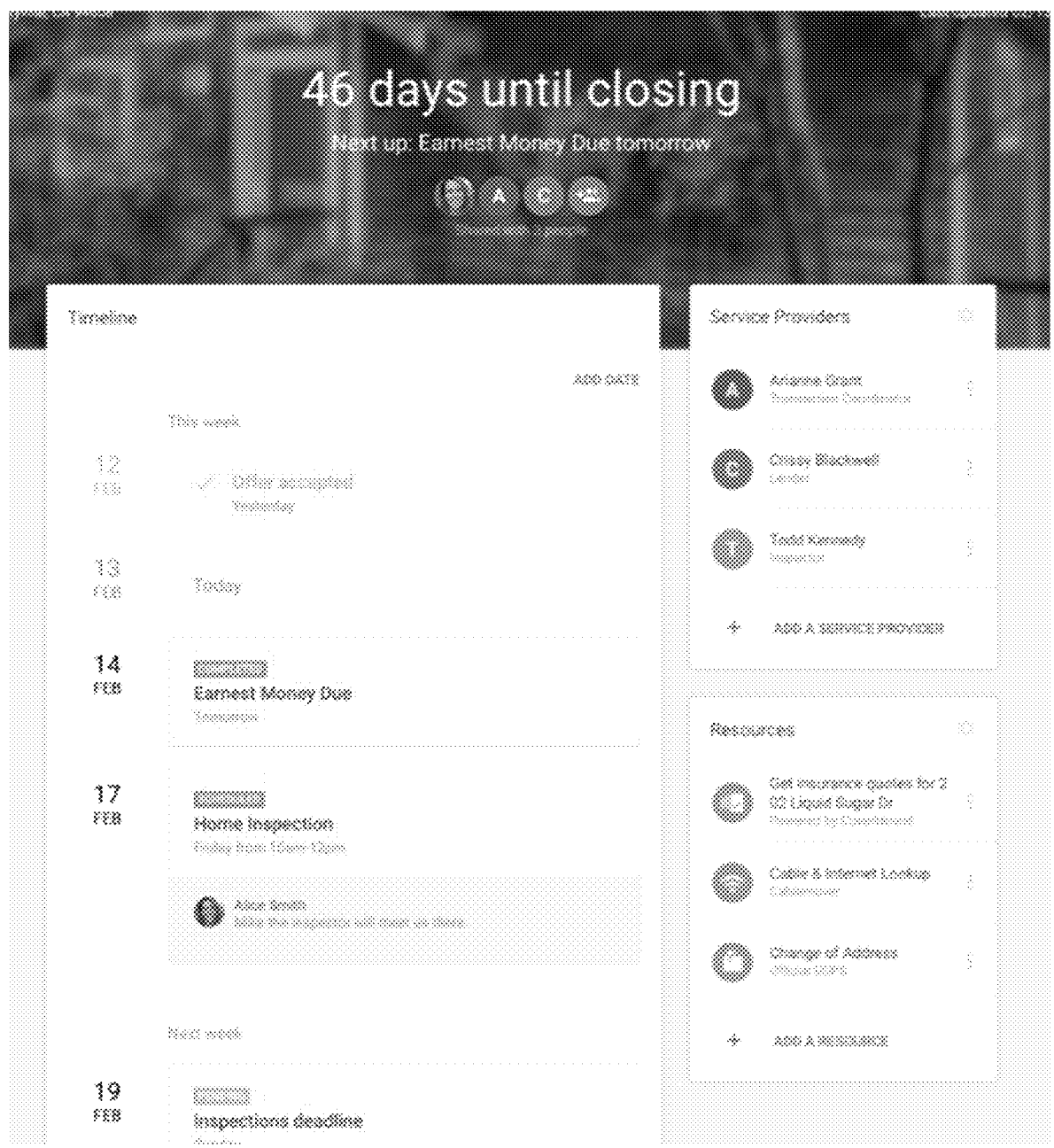
FIG. 8 shows a non-limiting graphic user interface for an automated real estate transaction workflow management application; in this case, an interface displaying a timeline website.

Referring to FIG. 8, in a particular embodiment, the application displays a timeline on an external website. Additionally displayed are service providers associated with the transaction and links to external resources relevant to a real estate transaction.

Figure 12:
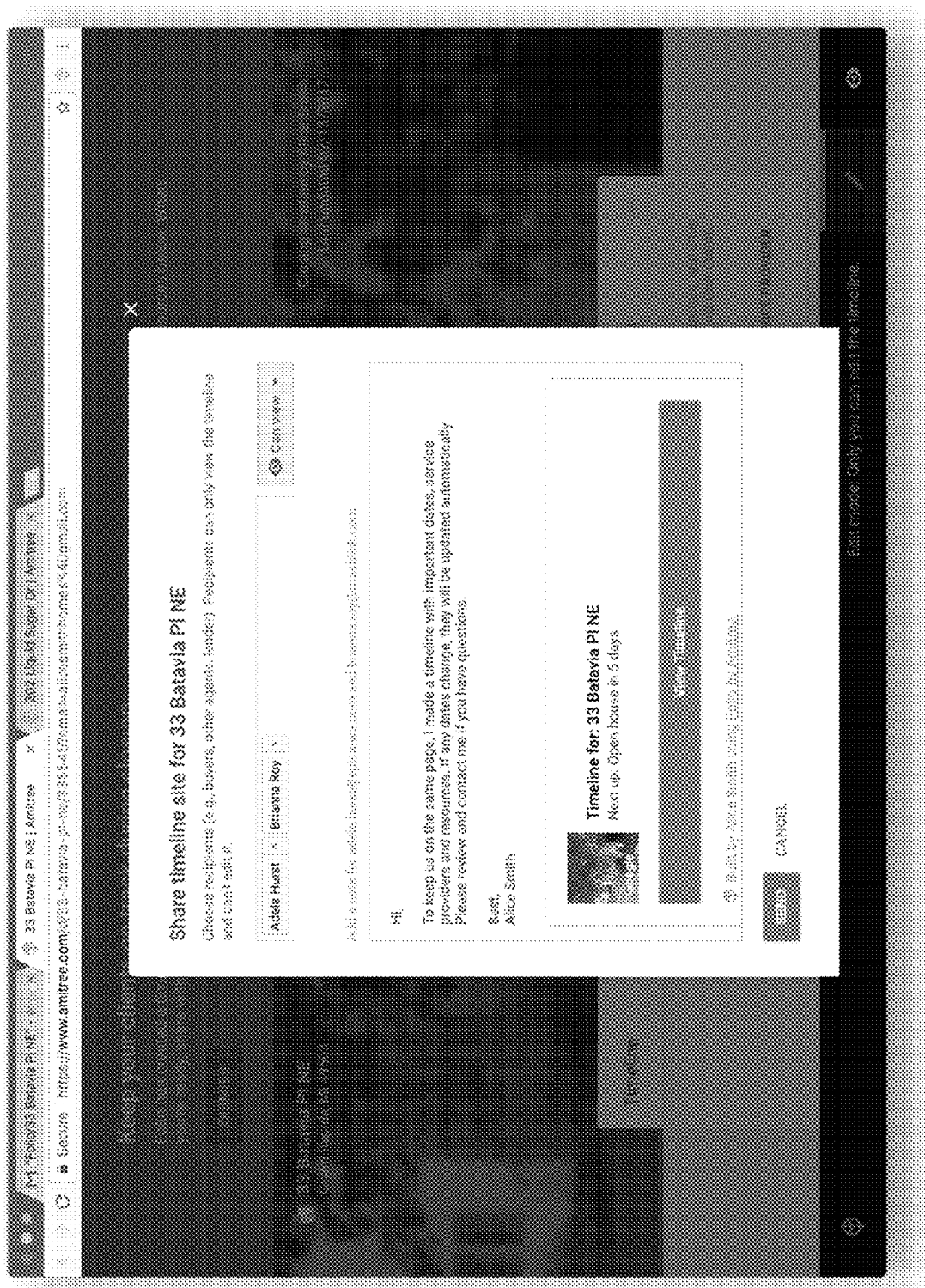
FIG. 12 shows a non-limiting graphic user interface for an automated real estate transaction workflow management application; in this case, an interface displaying a preview of an email sharing a transaction timeline with a client.

Referring to FIG. 12, in a particular embodiment, the application generates a preview of an email sharing a timeline with one or more contacts associated with transaction.

User Feedback

In some embodiments, the platforms, systems, media, and methods described herein include receiving user feedback on automated actions of the application, or use of the same. In some embodiments, a user can confirm or reject a new transaction identified in an initial or incremental analysis. In some embodiments, a user can confirm or reject the association of an email with a known transaction by an initial or incremental analysis. In some embodiments, a user can confirm or reject the association with a transaction of an extracted name, sender, email message ID, fingerprint, event, date, document or other extracted data. In some embodiments, a user can select from a list of suggested contacts generated by the workflow management application based on the data extracted from the email(s) associated with the transaction.

Figure 2:
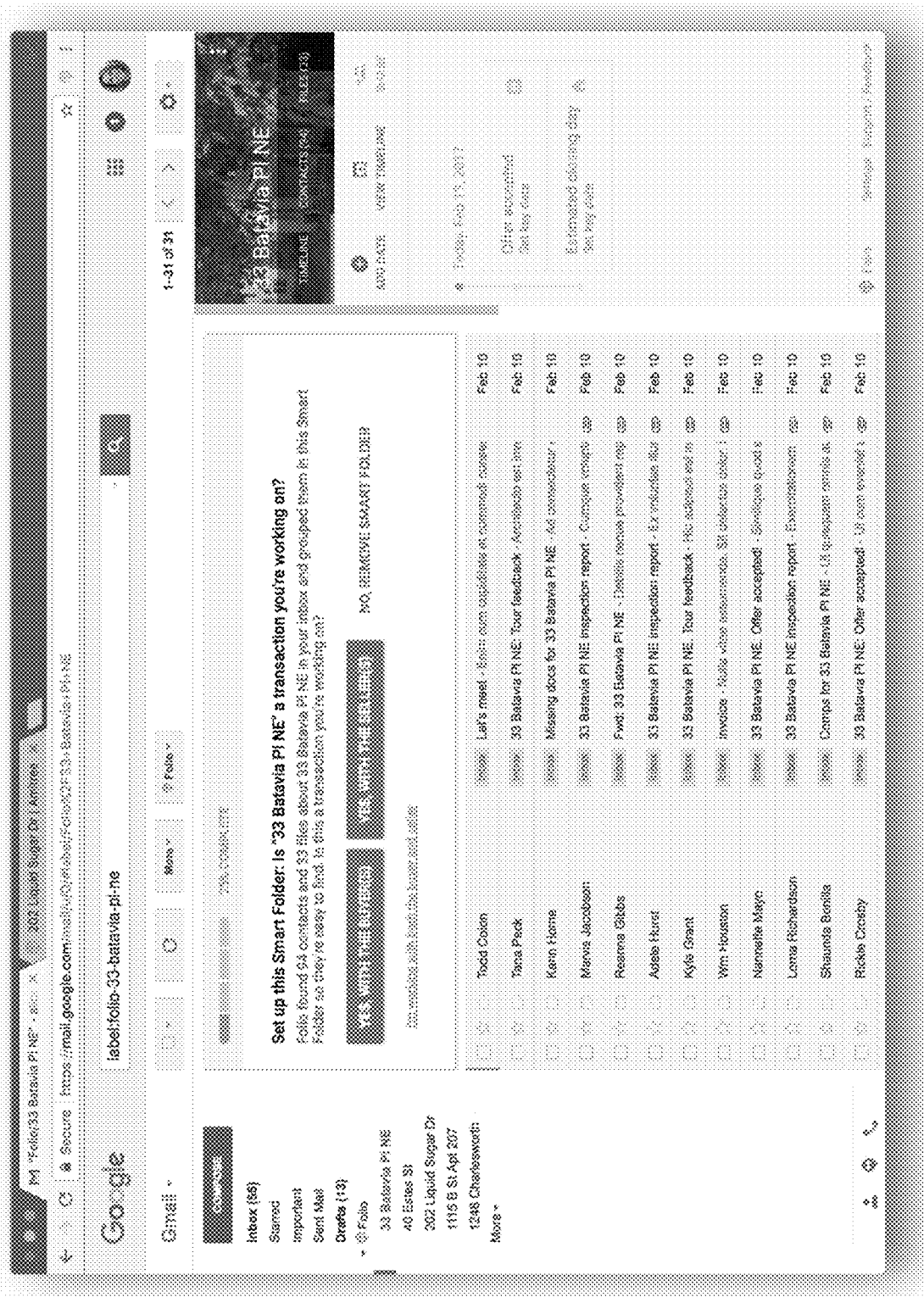
FIG. 2 shows a non-limiting graphic user interface for an automated real estate transaction workflow management application; in this case, an interface for identifying the type of client when setting up an email inbox smart folder for an identified real estate transaction.

Referring to FIG. 2, in a particular embodiment, the application prompts the user to confirm an identified real estate transaction as a client-buyer or a client-seller. The user may also reject the new transaction and remove the auto-generated smart folder.

Front-End Interfaces

In some embodiments, the platforms, systems, media, and methods described herein include front-end user interfaces to integrate the application into existing email applications. In some embodiments, the workflow management application integrates a timeline into the user's external email system. In some embodiments, the workflow management system displays a timeline associated with a particular transaction when the user selects an email that is associated with that transaction. In some embodiments, the workflow management application creates "smart folders" within a user's external email application that allow a user to sort and view emails in their external email system based on their association with known real estate transactions. In some embodiments, smart folders may be automatically created when a new transaction is added to the workflow management system, or may be manually created by the user. In some embodiments, a timeline integrated into a user's external email application may be resized or repositioned within the GUI of the external email system. In some embodiments, a user may select, modify, or delete events on a timeline from within the user's external email application. In some embodiments, the GUI may display contacts or documents associated with a transaction, integrated into the users external email application. In some embodiments, the workflow management system may provide a direct link from a user's external email application or external calendar application to the user's timeline on an external timeline website. In some embodiments, the workflow management system may provide a direct link from a user's timeline on an external timeline website to a user's external email application or a user's external calendar application.

In some embodiments, the platforms, systems, media, and methods described herein include a front-end user interface that is standalone from the user's external email application. In some embodiments, the standalone user interface is presented on a website. In some embodiments, the user may access the standalone user interface on the website without a browser extension, plug-in, add-in, or add-on. In some embodiments, the website is a mobile website. In some embodiments, the standalone user interface can provide access to the results of an initial or incremental analysis. The standalone user interface can display a list of newly identified transactions. The standalone user interface may be synchronized with a user interface integrated into the user's external email application. In some embodiments, the standalone user interface may allow the user to perform the same actions as the user interface integrated into the user's external email applications. For example, the standalone user interface may allow a user to set up a new timeline for newly identified transactions, modify an existing timeline, confirm or reject newly identified transactions, add, delete, or modify contacts, or associate or dissociate contacts from new or existing transactions. The standalone user interface may allow a user to perform additional actions, such as building or maintaining graphical templates for timelines, specify common collaborators, change account settings, modify a subscription to the workflow management application, or opt into security notifications related to suspicious or fraudulent emails discovered in the user's external email application.

Referring to FIG. 2, in a particular embodiment, the application displays information regarding a known transaction as a "side bar" on the right side of the Gmail application. The side bar has separate tabs for the timeline (currently displayed), contacts, and documents associated with the transaction.

Figure 9:
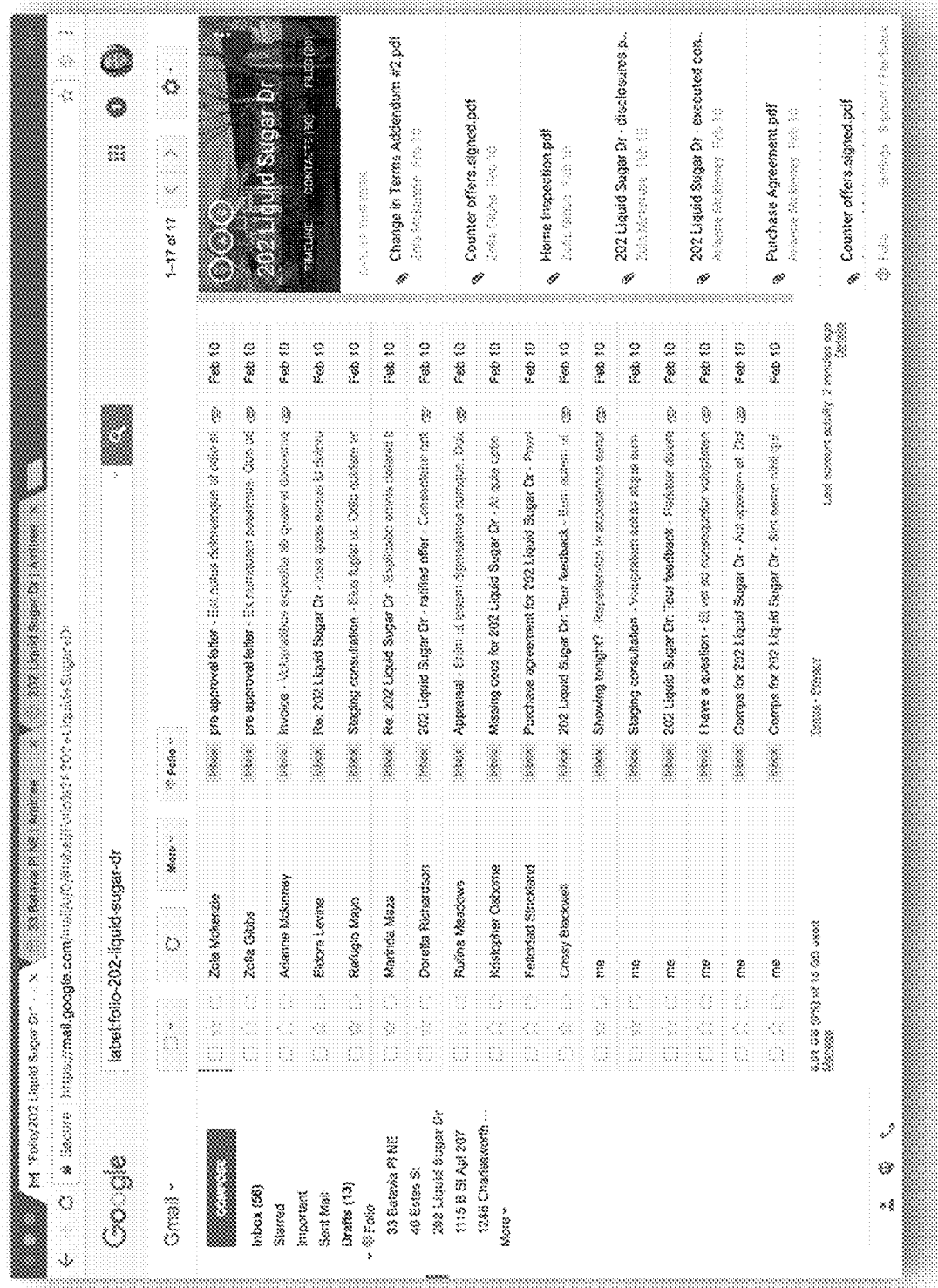
FIG. 9 shows a non-limiting graphic user interface for an automated real estate transaction workflow management application; in this case, an interface displaying an email inbox side bar which displays files and/or documents associated with a transaction.

Referring to FIG. 9, in a particular embodiment, the application displays documents associated with a transaction in the side bar on the right side of the user's Gmail application.

Figure 11:
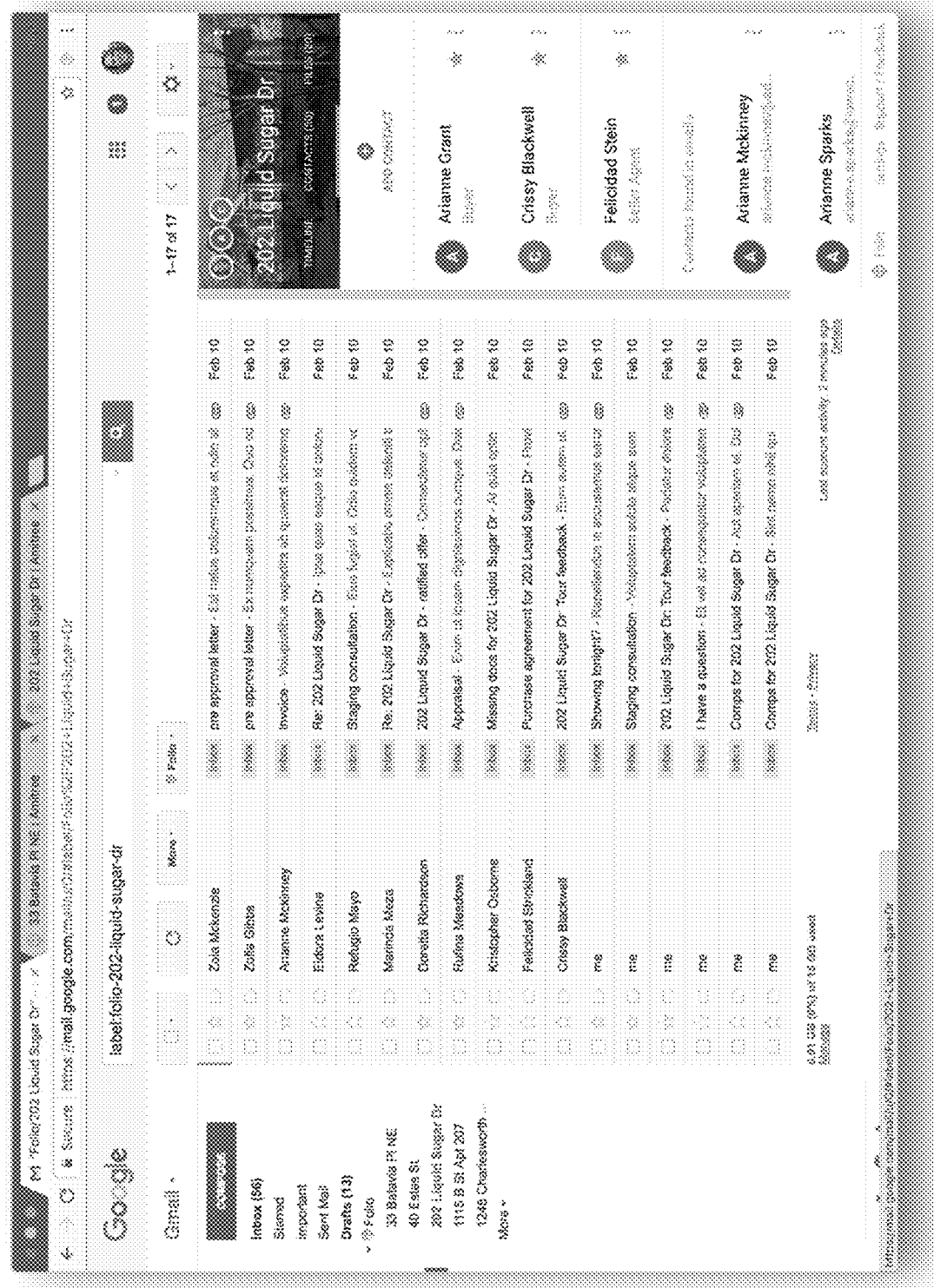
FIG. 11 shows a non-limiting graphic user interface for an automated real estate transaction workflow management application; in this case, an interface displaying an email inbox side bar which displays contacts associated with a transaction.

Referring to FIG. 11, in a particular embodiment, the application displays contacts associated with a transaction in the side bar on the right side of the user's Gmail application.

In further embodiments, the workflow management system includes GUI for a user to confirm a real estate transaction identified by an initial analysis of a user's stored emails. In some embodiments, the GUI prompts the user with suggested clients or contacts for a particular real estate transaction that are identified from an initial analysis of a user's stored emails. In some embodiments, the GUI allows a user to identify suggested contacts as a client, buyer, and/or seller. In some embodiments, the GUI allows a user to reject suggested clients or contacts as not associated with a particular real estate transaction. In some embodiments, the GUI prompts the user with suggested service providers for a particular real estate transaction identified from an initial analysis of a user's stored emails. In some embodiments, the GUI prompts a user to identify particular dates associated with a real estate transaction. In some embodiments, the GUI allows a user to manually enter data associated with a real estate transaction. In some embodiments, a user can manually enter contacts, contact information, events, event dates, event details, or personal notes to be associated with a particular real estate transaction. In some embodiments, a user can manually add or remove known transactions from the workflow management application.

Figure 3:
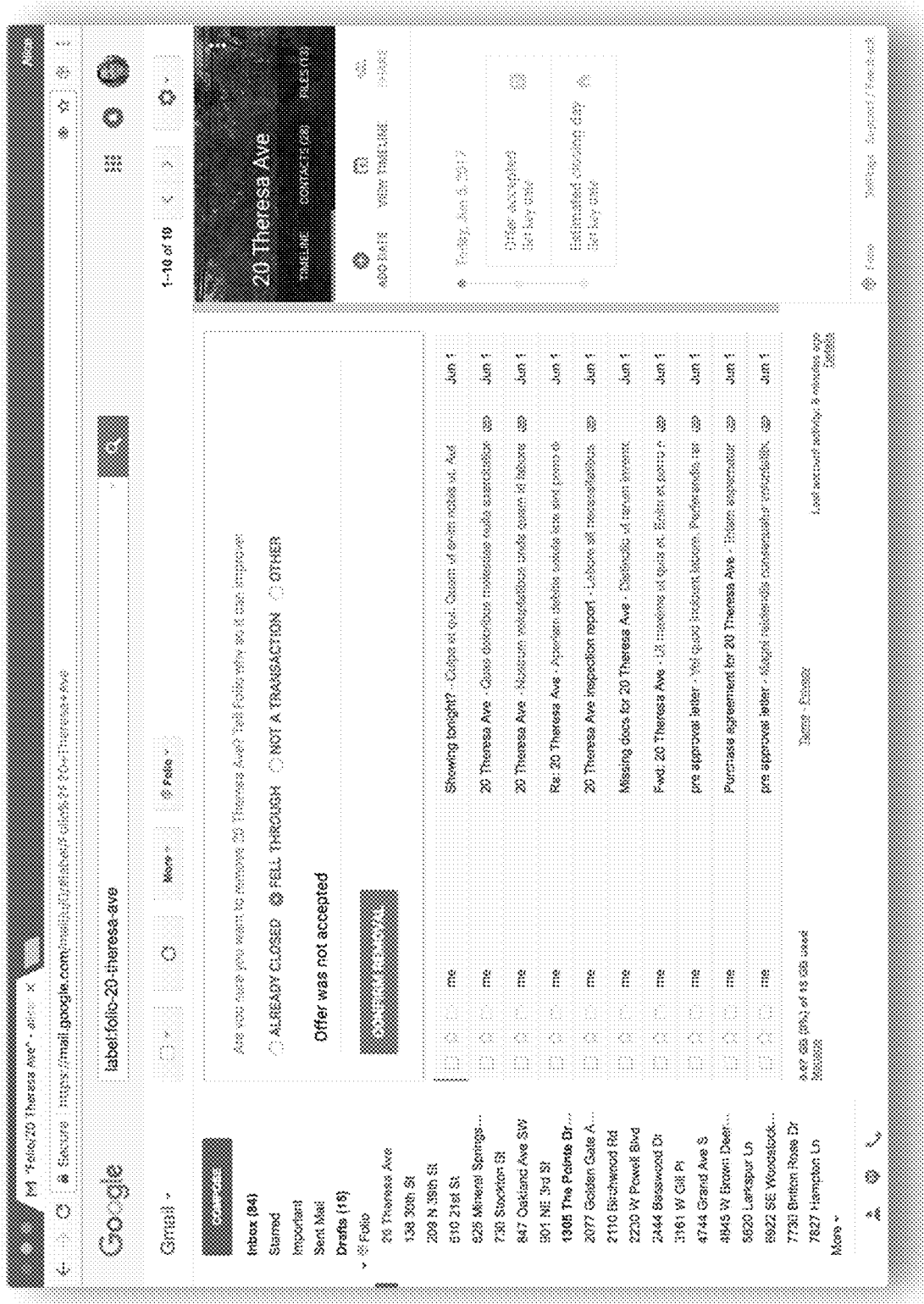
FIG. 3 shows a non-limiting graphic user interface for an automated real estate transaction workflow management application; in this case, an interface for removing a real estate transaction from the workflow management application.

Referring to FIG. 3, in a particular embodiment, the application enables a user to remove a transaction from the workflow management application. The GUI prompts the user to choose a reason for removing the transaction for, so that a record of the transaction may be archived in a database associated with the transaction for later access.

Figure 10:
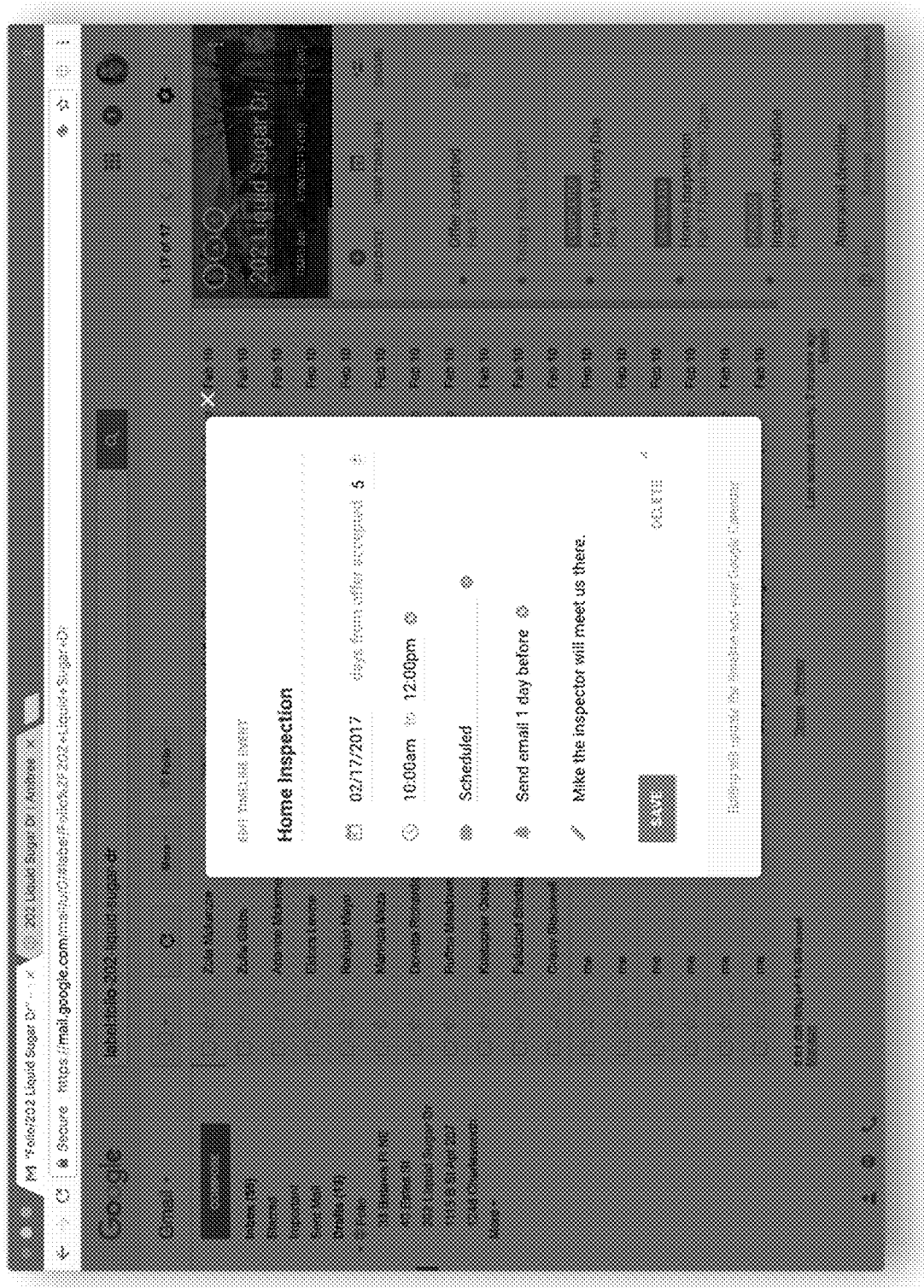
FIG. 10 shows a non-limiting graphic user interface for an automated real estate transaction workflow management application; in this case, an interface for editing an event in a transaction timeline from an email inbox sidebar.

Referring to FIG. 10, in a particular embodiment, the application allows a user to manually enter or edit event information associated with a known transaction.

Authentication

In some embodiments, the workflow management system includes an authentication system. The authentication system enables identification of a user and associates various properties with the user. In some embodiments, when a user accesses an interface, such as a web extension, the user is prompted to authenticate using a web-based authentication system, such as Google or Microsoft via OAuth 2.0. In some embodiments, upon successful authentication, an authentication token is stored in the workflow management system database and is associated with the user's account. In some embodiments, an authentication token allows the workflow management system to access the user's existing email application. In some embodiments, cookies and/or authentication headers are used to persist authentication within the interface.

Sharing Content

In some embodiments, the systems, platforms, media, applications, and methods described herein include a software module for sending content identified for sharing to selected destinations and/or individuals via one or more electronic communications channels, or provision and/or use of the same. In further embodiments, a software module for sending content utilizes, by way of non-limiting examples, Transmission Control Protocol/Internet Protocol (TCP/IP), including for example, Hypertext Transfer Protocol (HTTP), Simple Mail Transfer Protocol (SMTP), File Transfer Protocol (FTP), Secure Shell (SSH), Post Office Protocol (POP), and Internet Message Access Protocol (IMAP), and combinations thereof to send content to selected destinations and/or individuals. In further embodiments, a software module for sending content utilizes, by way of non-limiting examples, Short Message Service (SMS), Multimedia Message Service (MMS), web-based email, instant messaging, voicemail, Voice over Internet Protocol (VoIP), and combinations thereof to send content to selected destinations and/or individuals.

In some embodiments, a software module for sending content identified for sharing to selected destinations and/or individuals sends an address for content, such as a Uniform Resource Locator (URL) or a Uniform Resource Identifier (URI). In other embodiments, a software module for sending content identified for sharing to selected destinations and/or individuals sends the content, a copy of the content, or a representation of the content.

In embodiments including a software module for annotating shared content, where a user annotates content, an annotation (e.g., text, image, audio, video, multimedia, or a combination thereof) is sent in association with content identified for sharing. In further embodiments, an annotation is sent, for example, in series with content, in parallel with content, or appended to content.

Benchmarking

In some embodiments, the workflow management system provides data to the user comparing the user's transactions to the transactions of other users of the workflow management system. Non-limiting examples of such benchmarking data include transaction volume and sale-price-to-list-price ratio.

Digital Processing Device

In some embodiments, the platforms, systems, media, and methods described herein include a digital processing device, or use of the same. In further embodiments, the digital processing device includes one or more hardware central processing units (CPUs) or general purpose graphics processing units (GPGPUs) that carry out the device's functions. In still further embodiments, the digital processing device further comprises an operating system configured to perform executable instructions. In some embodiments, the digital processing device is optionally connected to a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with the digital processing device, such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Figure 14:
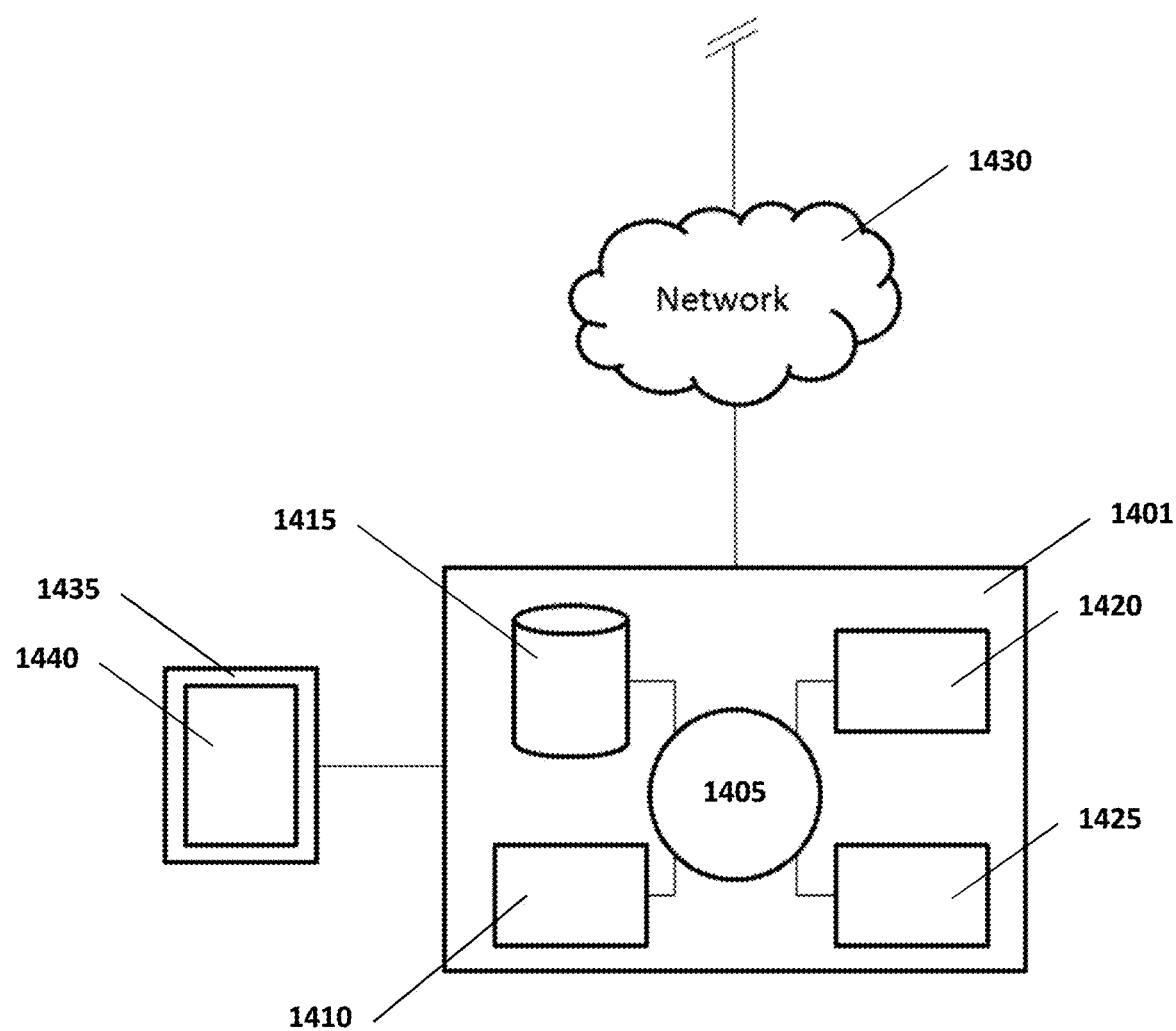
FIG. 14 shows a non-limiting schematic diagram of a digital processing device; in this case, a device with one or more CPUs, a memory, a communication interface, and a display.

Referring to FIG. 14, in a particular embodiment, an exemplary digital processing device 1401 is programmed or otherwise configured to identify transactions, emails associated with transactions, and/or extract transaction related information from email. The device 1401 can regulate various aspects of workflow management of the present disclosure, such as, for example, automated transaction timeline generation and syncing of events, contacts, or documents. In this embodiment, the digital processing device 1401 includes a central processing unit (CPU, also "processor" and "computer processor" herein) 1405, which can be a single core or multi core processor, or a plurality of processors for parallel processing. The digital processing device 1401 also includes memory or memory location 1410 (e.g., random-access memory, read-only memory, flash memory), electronic storage unit 1415 (e.g., hard disk), communication interface 1420 (e.g., network adapter) for communicating with one or more other systems, and peripheral devices 1425, such as cache, other memory, data storage and/or electronic display adapters. The memory 1410, storage unit 1415, interface 1420 and peripheral devices 1425 are in communication with the CPU 1405 through a communication bus (solid lines), such as a motherboard. The storage unit 1415 can be a data storage unit (or data repository) for storing data. The digital processing device 1401 can be operatively coupled to a computer network ("network") 1430 with the aid of the communication interface 1420. The network 1430 can be the Internet, an internet and/or extranet, or an intranet and/or extranet that is in communication with the Internet. The network 1430 in some cases is a telecommunication and/or data network. The network 1430 can include one or more computer servers, which can enable distributed computing, such as cloud computing. The network 1430, in some cases with the aid of the device 1401, can implement a peer-to-peer network, which may enable devices coupled to the device 1401 to behave as a client or a server.

Continuing to refer to FIG. 14, the CPU 1405 can execute a sequence of machine-readable instructions, which can be embodied in a program or software. The instructions may be stored in a memory location, such as the memory 1410. The instructions can be directed to the CPU 1405, which can subsequently program or otherwise configure the CPU 1405 to implement methods of the present disclosure. Examples of operations performed by the CPU 1405 can include fetch, decode, execute, and write back. The CPU 1405 can be part of a circuit, such as an integrated circuit. One or more other components of the device 1401 can be included in the circuit. In some cases, the circuit is an application specific integrated circuit (ASIC) or a field programmable gate array (FPGA).

Continuing to refer to FIG. 14, the storage unit 1415 can store files, such as drivers, libraries and saved programs. The storage unit 1415 can store user data, e.g., user preferences and user programs. The digital processing device 1401 in some cases can include one or more additional data storage units that are external, such as located on a remote server that is in communication through an intranet or the Internet.

Continuing to refer to FIG. 14, the digital processing device 1401 can communicate with one or more remote computer systems through the network 1430. For instance, the device 1401 can communicate with a remote computer system of a user. Examples of remote computer systems include personal computers (e.g., portable PC), slate or tablet PCs (e.g., Apple® iPad, Samsung® Galaxy Tab), telephones, Smart phones (e.g., Apple® iPhone, Android-enabled device, Blackberry®), or personal digital assistants.

Methods as described herein can be implemented by way of machine (e.g., computer processor) executable code stored on an electronic storage location of the digital processing device 1401, such as, for example, on the memory 1410 or electronic storage unit 1415. The machine executable or machine readable code can be provided in the form of software. During use, the code can be executed by the processor 1405. In some cases, the code can be retrieved from the storage unit 1415 and stored on the memory 1410 for ready access by the processor 1405. In some situations, the electronic storage unit 1415 can be precluded, and machine-executable instructions are stored on memory 1410.

Non-Transitory Computer Readable Storage Medium

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET EmberJS, and/or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Figure 15:
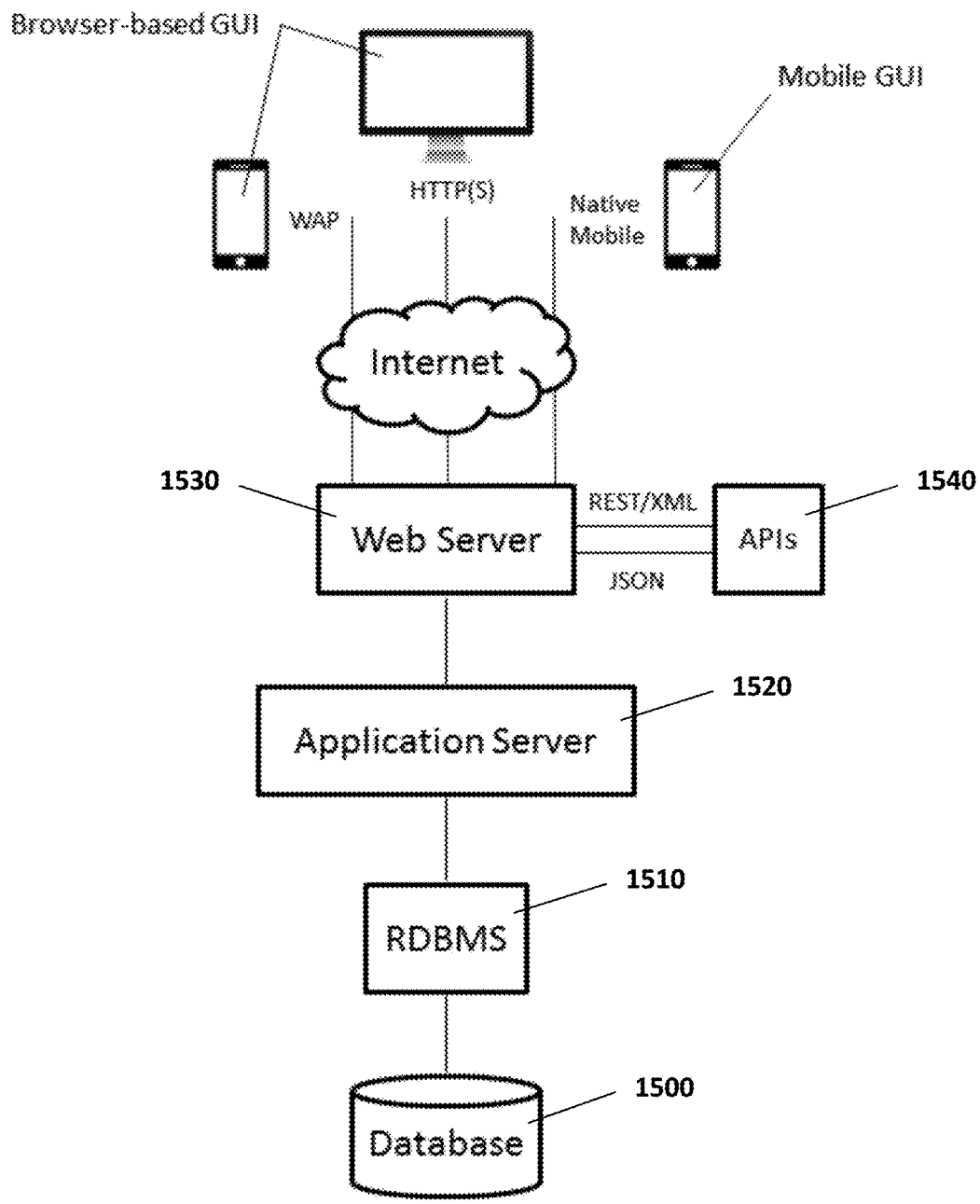
FIG. 15 shows a non-limiting schematic diagram of a web/mobile application provision system; in this case, a system providing browser-based and/or native mobile user interfaces.

Referring to FIG. 15, in a particular embodiment, an application provision system comprises one or more databases 1500 accessed by a relational database management system (RDBMS) 1510. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. In this embodiment, the application provision system further comprises one or more application severs 1520 (such as Java servers, .NET servers, PHP servers, and the like) and one or more web servers 1530 (such as Apache, IIS, GWS and the like). The web server(s) optionally expose one or more web services via app application programming interfaces (APIs) 1540. Via a network, such as the Internet, the system provides browser-based and/or mobile native user interfaces.

Figure 16:
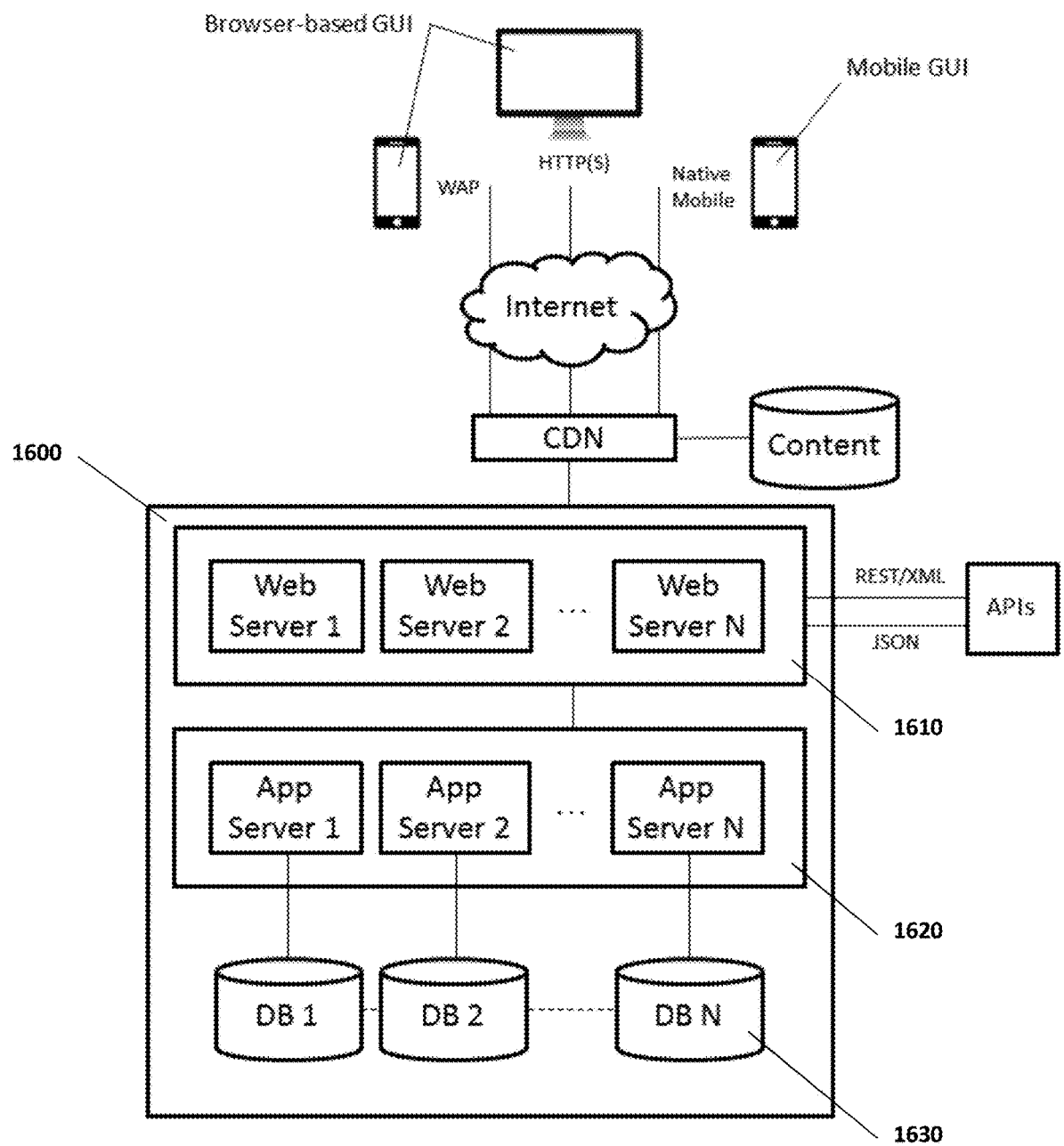
FIG. 16 shows a non-limiting schematic diagram of a cloud-based web/mobile application provision system; in this case, a system comprising an elastically load balanced, auto-scaling web server and application server resources as well synchronously replicated databases.

Referring to FIG. 16, in a particular embodiment, an application provision system alternatively has a distributed, cloud-based architecture 1600 and comprises elastically load balanced, auto-scaling web server resources 1610 and application server resources 1620 as well synchronously replicated databases 1630.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome Web Store, BlackBerry® App World, App Store for Palm devices, App Catalog for webOS, Windows® Marketplace for Mobile, Ovi Store for Nokia® devices, Samsung® Apps, and Nintendo® DSi Shop.

Web Browser Plug-in

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome®, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In a preferred embodiment, the cloud computing platform is Heroku. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of transaction, timeline, event, contact, and/or document information. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

EXAMPLES

The following illustrative examples are representative of embodiments of the systems, media, and methods described herein and are not meant to be limiting in any way.

Example 1—Performing Initial Analysis and Identifying Known Transactions

A real estate agent manages numerous clients simultaneously, each of which send the agent numerous emails and each requiring individual scheduling. The amount of time necessary to sort and organize the communications, timelines, and statuses of each of the agent's clients, strongly incentivizes the agent to utilize an automated transaction workflow management application. The agent installs the workflow management application as a browser extension on the agent's work computer. Upon completion of the installation, the application automatically performs an initial analysis of the agent's email inbox, identifying candidate emails containing keywords relevant to real estate transactions and identifying potential existing real estate transactions based on the data extracted from the candidate emails. The application automatically integrates a side bar into the GUI of the agent's Gmail application, which displays contacts and documents automatically associated with each of the identified transactions.

Example 2—Generating a Timeline

Upon completion of an initial analysis, the agent selects an identified transaction and, following prompts, confirms that this transaction is associated with a client who is a home buyer. Based on the data extracted from the emails, the application prompts the agent with suggestions of which of the associated contacts are the buyer and the seller. The agent selects the correct buyer name and seller name from the application prompt. The application then prompts the agent to enter an "offer accepted" date and "estimated closing" date, if available. These dates, when entered, are automatically updated into the timeline for the transaction. The agent selects a link directing her internet browser to an external timeline website. The agent then selects the timeline to add an additional timeline event, an "inspection" of the property. The agent adds a date and time for the inspection, adds a note that the inspector will meet the agent and client at the property, and saves the information to the timeline. The agent then selects the "Service Provider" icon and after typing the inspector's name, the application prompts the agent with suggestions from her contact list. The agent selects the inspector from the list of suggestions, and the application imports the inspector's contact information from agent's external contact list.

Example 3—Sharing a Timeline

The agent selects the "Share" button on the timeline website, which automatically generates a preview of an email to the client providing a link to the timeline website, where the client will able to view the timeline and see upcoming events relevant to the home purchase. The agent edits the default text of the email to personalize it to her client, and selects send. The home buyer, receiving the email, selects the link embedded within in, directing her internet browser to the timeline website, where she can see all upcoming events. Subsequently, according to the schedule in the timeline, the buyer and agent meet the inspector at the agreed upon time to conduct a successful inspection of the property.

Example 4—Back-End Software Function

Authentication

When a user of the workflow management application accesses protected back-services from an interface (e.g. a Chrome extension), the user is prompted to authenticate with Google or Microsoft via OAuth 2.0. Upon successful authentication, a token is stored on the workflow management system's database and is associated with the user's account. The token allows identification of the user, and allows the workflow management application to access and modify the user's information in their email account. Cookies and authentication headers are used to persist authentication within the interface.

Email Scanning System and Data Extraction Engine

The workflow management application performs an initial scan every time a new token is created (i.e., when a user registers their external account with the workflow management application. The scan looks back 30 days, although this time period can be adjusted by the user. An incremental scan is performed whenever the user receives new email. The incremental scan looks at emails since the previous incremenatal scan. For external accounts that are on Google, in order to ensure that the frequency of email scanning is appropriate, the workflow management application accesses Google's Pub/Sub service. A dedicated dyno type called the Gmail Poller constantly asks Google which tokens have new email. For each token indicated, that token is flagged for processing, and another dedicated dyno type called the Gmail Syncher insures that the incremental scan gets run (FIFO). On Microsoft's platform, the workflow management application round-robins and scans each token based on how recently it was scanned.

Both of the initial scan and the incremental scan performs two core actions.

First the workflow management application attempts to identify new transactions. Google and Microsoft's search capabilities are utilized to narrow the candidate set of emails that may be about a new transaction by performing queries like "ratified offer" and "purchase agreement." For each matching candidate email message, the subject, body, attachment names, and PDF attachment text are extracted, and OCR is run on any PDF attachments that do not contain textual data. For each of these attributes, identified text is uploaded to a third party service called Smarty Streets, which extracts addresses from free-form text and provides them in structured form and with additional metadata. If there is a residential address found and the token has no existing transactions with that address, that message is considered to represent a new transaction and the new transaction is created in an "unconfirmed state." If no addresses are found, the message is ignored. If an address is found and the token has an existing transaction with that address, the workflow management application associates the message with the existing transaction.

Second, the workflow management application attempts to identify email messages that belong to a known transaction. Known transactions are those found in previous scans and also those that are "shared" with the user by another user (e.g. two agents working on the same deal). For each token the workflow management application utilizes Google and Microsoft's search capabilities to find messages that match the addresses of that token's transactions. To improve capture, the workflow management application searches the "base" street address (e.g., to find messages for the property at "123 Main Street South, Anytown, US" the workflow management application searches for "123 Main"). Smarty Streets is used to determine the base street address.

For any messages found via any of the scan mechanisms, the workflow management application does the following steps. First, the workflow management application extracts the sender and recipient's name and email addresses, stores them as a "found contact" in the workflow management application's database associated with the transaction. The workflow management application also synchronizes this contact to the user's external account contact list. Second, the workflow management application downloads attachments, fingerprints them with an MD5 hash function, and records the name, sender, email message ID, and fingerprint in the database. Third, for new transactions, the workflow management application creates and applies a "category" to the email message in the external account (e.g. Folio/123 Main Street). In Gmail, this is called a "label." In Microsoft, this is called a "category."

The email scanner uses a dedicated group of dynos for incremental scans (e.g. "Gmail Scanner") and the Importer dynos for initial scans. The workflow management application defers processing messages with large attachments (>1 MB) to another dyno queue called Large Importers in order to insure that a few large messages don't delay processing of other email messages.

Synchronization

In order to provide user value by building the workflow management application into a user's external account, various aspects of the content maintained in the workflow management application are synchronized to the token's external account. Changes made on the external account side are also synced to the workflow management application. Synchronizations are performed by several systems.

A "Label Syncer" ensures that whenever a user deletes a label in Gmail, the corresponding transaction is removed from the workflow management application, because this deletion indicates that the user no longer wants to manage the transaction.

A "Contact Syncer" ensures that any changes a user makes to their contacts in their external account are synchronized to the representation of the contact in the workflow management application. When a change is made to a contact in the workflow management application, that change is synchronized to Google.

A "Transaction Syncer" ensures that if a user manually adds an email message to a label associated with the message, that the state is synchronized to the workflow management application side. This runs the same code as the incremental scanner, but is triggered by the user acting in Gmail as opposed to the the workflow management application acting automatically.

A "Calendar Syncer" ensures that whenever a user adds, changes, or removes a date in a transaction timeline, the event is synchronized to their calendar (and to the calendar of anyone who is an "editor" of the timeline.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. A computer-implemented system comprising: a digital processing device comprising: at least one processor, an operating system configured to perform executable instructions, a memory, and a computer program including instructions executable by the digital processing device to generate an automated real estate transaction workflow management application comprising:
   a) a software module performing an initial analysis of a user's stored email, wherein the initial analysis comprises scanning for, and optionally identifying an existing real estate transaction and identifying one or more stored emails associated with the existing real estate transaction;
   b) a software module performing an incremental analysis of the user's new email, wherein the incremental analysis comprises:
      i) identifying one or more new emails associated with the existing real estate transaction;
      ii) generating a search query comprising one or more components that are based on a predetermined search criteria;
      iii) scanning for, and optionally identifying a prospective real estate transaction based on the search query; and
      iv) identifying one or more new emails associated with the prospective real estate transaction (PRET email);
   c) a software module extracting real estate transaction-related events, documents, contacts, and data from 1) the one or more stored emails and the one or more new emails identified as associated with the existing real estate transaction, and 2) the PRET email;
   d) a modeling and prediction (MP) module configured to:
      (i) provide a computational model trained to generate a score for the PRET email using the corresponding transaction-related events, documents, and/or data;
      (ii) process the PRET email using the computational model;
      (iii) identify a new real estate transaction based on the generated score for the PRET email;
      (iv) further train the computational model based on the transaction-related events, documents, and data associated with the PRET email; and
      (v) adjust the predetermined search criteria based on said further training to the computational model;
   e) a software module automatically generating a data folder for the existing real estate transaction and the new real estate transaction without user intervention, wherein each data folder is integrated with an external email application so as to provide consolidated access within a user interface to:
      (i) corresponding emails;
      (ii) a timeline comprising the transaction-related events automatically extracted from the corresponding stored emails and new emails associated with the existing real estate transaction or the corresponding PRET email, wherein the transaction-related events are arranged chronologically, wherein the user interface further provides access to the timeline as a separate website that further provides one or more hyperlinks to one or more transaction-related resources;
      (iii) corresponding contacts; and
      (iv) corresponding transaction-related documents and data, wherein said corresponding transaction-related documents and data are associated with a corresponding transaction-related event on the timeline,
   wherein, any updates to said corresponding emails, timeline, corresponding contacts, and corresponding transaction-related documents and data are automatically synchronized between the external email application and data folder.

2. The system of claim 1, wherein the real estate transaction workflow management application is implemented as a web browser extension, add-on, or plug-in.

3. The system of claim 1, wherein the user's email is web-based email.

4. The system of claim 1, wherein the initial analysis is performed on the user's stored email that is 30 days, or less, old.

5. The system of claim 1, wherein the incremental analysis is performed when the user sends or receives email.

6. The system of claim 1, wherein identifying the one or more stored emails and the one or more new emails associated with the existing real estate transaction and identifying the PRET email comprises performing optical character resolution (OCR) on one or more documents attached to an email thereof.

7. The system of claim 1, wherein extracting real estate transaction-related events, documents, contacts, and data from 1) the one or more stored emails and the one or more new emails identified as associated with the existing real estate transaction, or 2) the PRET email, comprises performing optical character resolution (OCR) on one or more documents attached to an email thereof.

8. The system of claim 1, wherein the real estate transaction workflow management application further comprises a software module presenting an interface allowing the user to share the timeline.

9. The system of claim 1, wherein the real estate transaction workflow management application further comprises a software module identifying participants in the existing or the new real estate transaction and sharing access to the timeline with each participant.

10. The system of claim 9, wherein the software module identifying participants in the existing or the new real estate transaction and sharing access to the timeline with each participant further notifies each participant when the timeline is updated.

11. The system of claim 1, wherein the computational model is cumulatively trained based on a plurality of new real estate transactions.

12. The system of claim 11, wherein the computational model is based on textual content from the extracted real estate transaction-related events, documents, contacts, and data from the PRET email associated with each new real estate transaction of the plurality of new real estate transactions.

13. The system of claim 1, wherein the computational model comprises applying a weighting scheme for generating the score.

14. The system of claim 1, wherein the computational model comprises a log-linear model, a random forest model, a neural network model, or a combination thereof.

15. The system of claim 1, wherein the one or more components comprises textual content that correlate with the new real estate transaction and associated PRET email.

16. The system of claim 1, wherein the computational model is further trained based on the real estate transaction-related events, documents, contacts, and data associated with the one or more stored emails and the one or more new emails identified as associated with the existing real estate transaction.

17. The system of claim 1, wherein the one or more transaction-related resources comprises a home insurance concierge service, a postal change-of-address service, or both.

18. Non-transitory computer-readable storage media encoded with a computer program including instructions executable by a processor to create an automated real estate transaction workflow management application comprising:
a) a software module performing an initial analysis of a user's stored email, wherein the initial analysis comprises scanning for, and optionally identifying an existing real estate transaction and identifying one or more stored emails associated with the existing real estate transaction;
b) a software module performing an incremental analysis of the user's new email, wherein the incremental analysis comprises
i) identifying one or more new emails associated with the existing real estate transaction;
ii) generating a search query comprising one or more components that are based on a predetermined search criteria;
iii) scanning for, and optionally identifying a prospective real estate transaction based on the search query; and
iv) identifying one or more new emails associated with the prospective real estate transaction (PRET email);
c) a software module extracting real estate transaction-related events, documents, contacts, and data from 1) the one or more stored emails and the one or more new emails identified as associated with the existing real estate transaction, and 2) the PRET email;
d) a modeling and prediction (MP) module configured to:
(i) provide a computational model trained to generate a score for the PRET email using the corresponding transaction-related events, documents, and/or data;
(ii) process the PRET email using the computational model;
(iii) identify a new real estate transaction based on the generated score for the PRET email;
(iv) further train the computational model based on the transaction-related events, documents, and data associated with the PRET email; and
(v) adjust the predetermined search criteria based on said further training to the computational model;
e) a software module automatically generating a data folder for the existing real estate transaction and the new real estate transaction without user intervention, wherein each data folder is integrated with an external email application so as to provide consolidated access within a user interface to:
(i) corresponding emails;
(ii) a timeline comprising the transaction-related events automatically extracted from the corresponding stored emails and new emails associated with the existing real estate transaction or the corresponding PRET email, wherein the transaction-related events are arranged chronologically, wherein the user interface further provides access to the timeline as a separate website that further provides one or more hyperlinks to one or more transaction-related resources;
(iii) corresponding contacts; and
(iv) corresponding transaction-related documents and data, wherein said corresponding transaction-related documents and data are associated with a corresponding transaction-related event on the timeline,
wherein, any updates to said corresponding emails, timeline, corresponding contacts, and/or corresponding transaction-related documents and data are automatically synchronized between the external email application and data folder.

19. A computer-implemented method of automatically managing workflow of a real estate transaction comprising:
a) performing, by a computer, an initial analysis of a user's stored email, wherein the initial analysis comprises scanning for, and optionally identifying an existing real estate transaction;
b) identifying, by the computer, one or more stored emails associated with the existing real estate transaction;

c) performing, by the computer, an incremental analysis of the user's new email, wherein the incremental analysis comprises 1) generating a search query comprising one or more components that are based on a predetermined search criteria; and 2) scanning for, and optionally identifying a prospective real estate transaction;

d) identifying, by the computer, 1) one or more new emails associated with the existing real estate transaction, and 2) one or more new emails associated with the prospective real estate transaction (PRET email);

e) extracting, by the computer, real estate transaction-related events, documents, contacts, and data from 1) the one or more stored emails and one or more new emails identified as associated with the existing real estate transaction, and 2) the PRET email;

f) providing, by the computer, a computational model trained to generate a score for the PRET email using the corresponding transaction-related events, documents, and/or data;

g) processing, by the computer, the PRET email using the computational model;

h) predicting, by the computer, a new real estate transaction based on the generated score for the PRET email;

i) training, by the computer, the computational model based on the transaction-related events, documents, and data associated with the PRET email, and j) adjusting, by the computer, the predetermined search criteria based on said further training to the computational model; and k) generating, by the computer, a data folder for the existing real estate transaction and the new real estate transaction without user intervention, wherein each data folder is integrated with an external email application so as to provide consolidated access within a user interface to:
(i) corresponding emails;
(ii) a timeline comprising the transaction-related events automatically extracted from the corresponding stored emails and new emails associated with the existing real estate transaction or the corresponding PRET email, wherein the transaction-related events are arranged chronologically, wherein the user interface further provides access to the timeline as a separate web site that further provides one or more hyperlinks to one or more transaction-related resources;
(iii) corresponding contacts; and
(iv) corresponding transaction-related documents and data, wherein said corresponding transaction-related documents and data are associated with a corresponding transaction-related event on the timeline.

20. The method of claim 19, further comprising synchronizing any updates to said corresponding emails, timeline, corresponding contacts, and/or corresponding transaction-related documents and data, between the external email application and data folder.

* * * * *